United States Patent
Asai et al.

(10) Patent No.: US 10,141,547 B2
(45) Date of Patent: Nov. 27, 2018

(54) NONAQUEOUS SECONDARY BATTERY AND METHOD FOR MANUFACTURING SAME

(71) Applicant: TOKYO OHKA KOGYO CO., LTD., Kawasaki-shi (JP)

(72) Inventors: Takahiro Asai, Kawasaki (JP); Kaoru Ishikawa, Kawasaki (JP); Mitsuo Hagihara, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/899,866

(22) PCT Filed: Jun. 19, 2014

(86) PCT No.: PCT/JP2014/066282
§ 371 (c)(1),
(2) Date: Dec. 18, 2015

(87) PCT Pub. No.: WO2014/203965
PCT Pub. Date: Dec. 24, 2014

(65) Prior Publication Data
US 2016/0149170 A1  May 26, 2016

(30) Foreign Application Priority Data

Jun. 21, 2013 (JP) .................. 2013-130892
Dec. 12, 2013 (JP) .................. 2013-257090

(51) Int. Cl.
*H01M 2/02* (2006.01)
*H01M 4/139* (2010.01)
(Continued)

(52) U.S. Cl.
CPC .......... *H01M 2/026* (2013.01); *H01M 2/0207* (2013.01); *H01M 4/139* (2013.01);
(Continued)

(58) Field of Classification Search
CPC .... H01M 2/02; H01M 10/04; H01M 10/0585; H01M 4/139; H01M 10/058;
(Continued)

(56) References Cited

U.S. PATENT DOCUMENTS 7,479,758 B2 * 1/2009 Moon ................. H01M 2/1061
320/107
8,389,204 B2   3/2013 Asai et al.
(Continued)

FOREIGN PATENT DOCUMENTS

EP   0302520 A1   2/1989
JP   H03-034267   2/1991
(Continued)

OTHER PUBLICATIONS

KR 20070008718 Abstract.*
(Continued)

*Primary Examiner* — Alexander Usyatinsky
(74) *Attorney, Agent, or Firm* — Knobbe Martens Olson & Bear LLP

(57) ABSTRACT

A nonaqueous secondary battery which can be made thinner without deterioration of battery performance, and a method for manufacturing the battery. The nonaqueous secondary battery includes a positive electrode and a negative electrode which are substantially arranged in the same plane so that respective end surfaces face each other at a distance; a substrate by which the positive electrode and the negative electrode are affixed and supported; a cover member having gas barrier properties, which defines an airtight chamber together with the substrate, in the chamber in which the positive electrode and the negative electrode are contained; and an electrolyte which is contained in the airtight chamber so as to be positioned at least between the facing end surfaces of the positive electrode and the negative electrode,
(Continued)

and which relates to the battery reaction between the positive electrode and the negative electrode.

13 Claims, 12 Drawing Sheets

(51) Int. Cl.
　　　$H01M\ 10/058$　　　(2010.01)
　　　$H01M\ 4/64$　　　(2006.01)
　　　$H01M\ 10/0525$　　　(2010.01)
　　　$H01M\ 10/0562$　　　(2010.01)
　　　$H01M\ 10/0565$　　　(2010.01)
　　　$H01M\ 10/04$　　　(2006.01)
　　　$H01M\ 10/0585$　　　(2010.01)

(52) U.S. Cl.
　　　CPC .............. *H01M 4/64* (2013.01); *H01M 10/04* (2013.01); *H01M 10/0436* (2013.01); *H01M 10/058* (2013.01); *H01M 10/0525* (2013.01); *H01M 10/0562* (2013.01); *H01M 10/0565* (2013.01); *H01M 10/0585* (2013.01); *H01M 2220/30* (2013.01)

(58) Field of Classification Search
　　　CPC .. H01M 2/0207; H01M 4/64; H01M 10/0525; H01M 10/0562; H01M 2/026; H01M 10/0436; H01M 10/0565; H01M 2220/30; Y02P 70/54
　　　See application file for complete search history.

(56) References Cited

U.S. PATENT DOCUMENTS

| | | | |
|---|---|---|---|
| 9,306,196 B2 | 4/2016 | Suzuta et al. | |
| 2004/0265688 A1* | 12/2004 | Arao | B32B 7/10 |
| | | | 429/176 |
| 2006/0121342 A1 | 6/2006 | Sano et al. | |
| 2006/0154141 A1 | 7/2006 | Salot et al. | |
| 2011/0256484 A1 | 10/2011 | Asai et al. | |
| 2012/0176730 A1 | 7/2012 | Takemura et al. | |
| 2014/0072864 A1* | 3/2014 | Suzuta | B32B 15/08 |
| | | | 429/176 |

FOREIGN PATENT DOCUMENTS

| | | |
|---|---|---|
| JP | 2001-068074 | 3/2001 |
| JP | 2004-066645 | 3/2004 |
| JP | 2006-147210 | 6/2006 |
| JP | 2006-185917 | 7/2006 |
| JP | 2011-238589 A | 11/2011 |
| JP | 2012-064569 | 3/2012 |
| JP | 2012-156489 A | 8/2012 |
| JP | 2013-120730 A | 6/2013 |
| KR | 20070008718 * | 1/2007 |
| WO | WO2012_153847 * | 11/2012 |
| WO | WO 2012/153847 A1 | 11/2012 |

OTHER PUBLICATIONS

JP2015522975, Notification_of_Reasons_for_Refusal_(Translated-),dated May 22, 2018.*
JP2015522975,Decision_to_Grant_a_Patent_(Translated),dated Sep. 4, 2018.*
Maki Ishizawa et al: "Ultra-Thin Sealed Lead-Acid Batteries", Japan Telecommunication Review, Telecommunications Association, Tokyo JP, vol. 4, No. 3, May 1, 1992, pp. 33-38, XP000306059.
Extended European search report in European Patent Application No. 14814103.9, dated May 2, 2016.
Notification of Reasons for Refusal issued in Japanese Patent Application No. 2015-522975, dated May 22, 2018.
Notification of Reasons for Refusal in Japanese Patent Application No. 2015-522975, dated Nov. 21, 2017.

* cited by examiner

FIG. 7
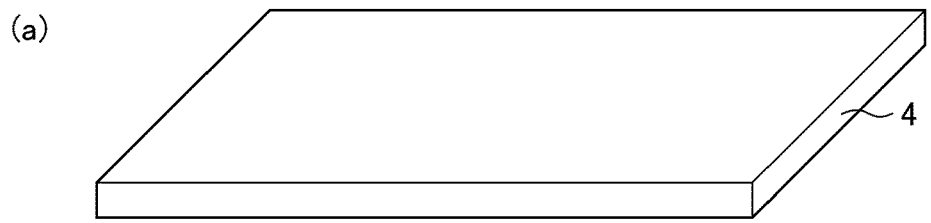
(a)
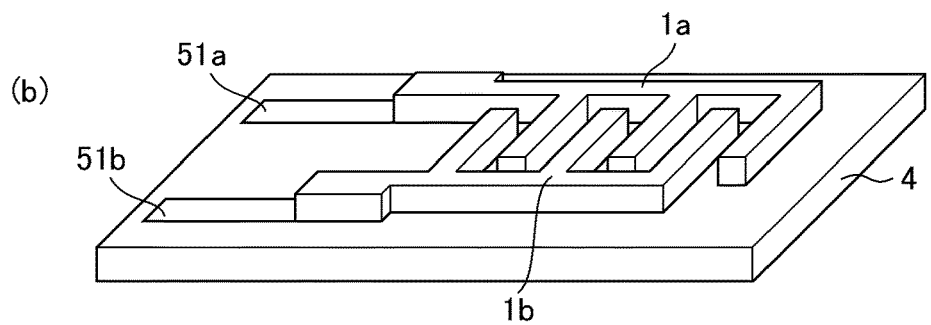
(b)
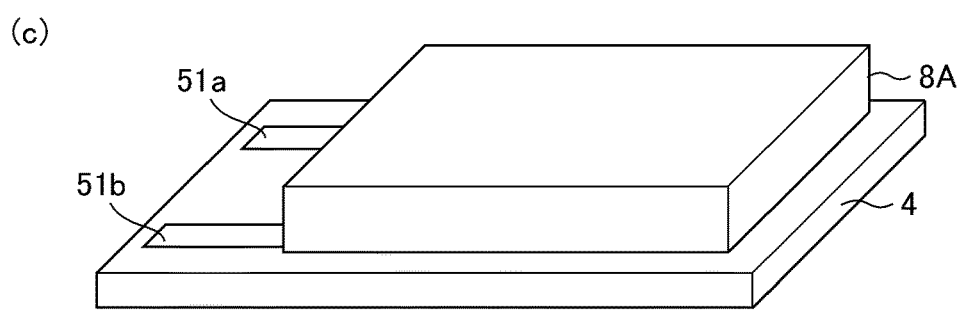
(c)
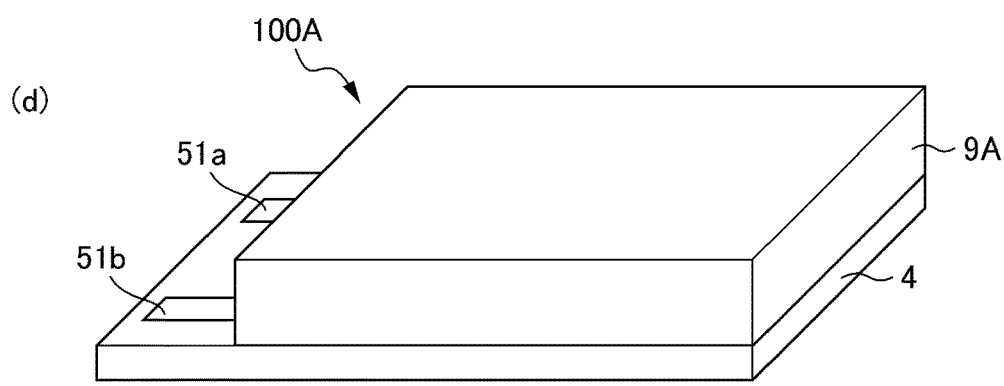
(d)

FIG. 8
(a) 
(b) 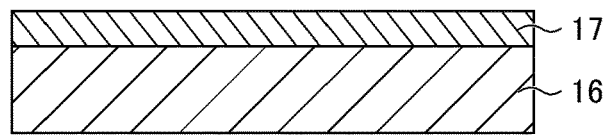
(c) 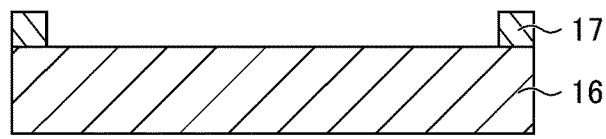
(d) 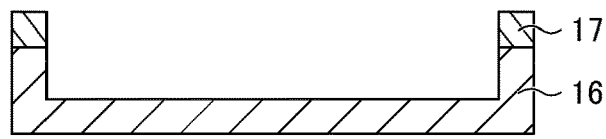
(e) 
(f) 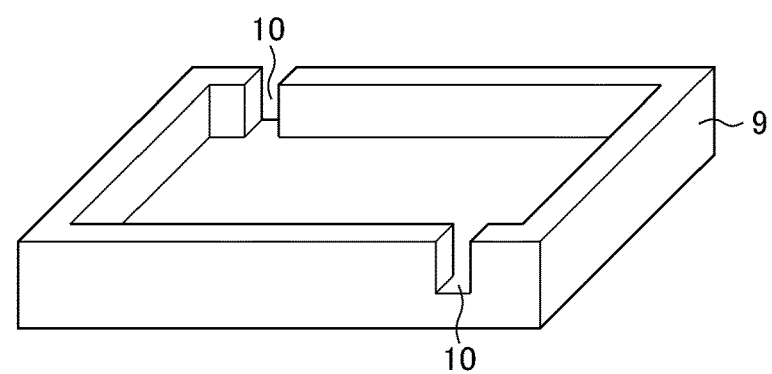

FIG. 14
(a)
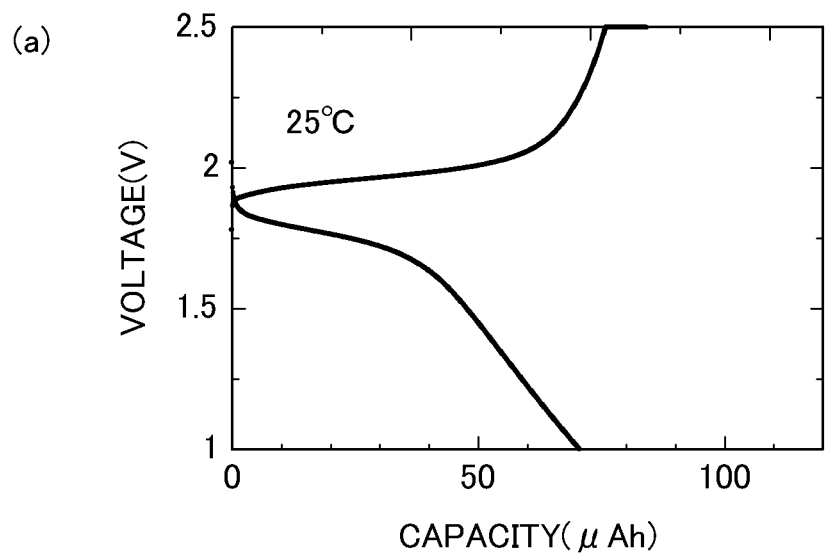
(b)
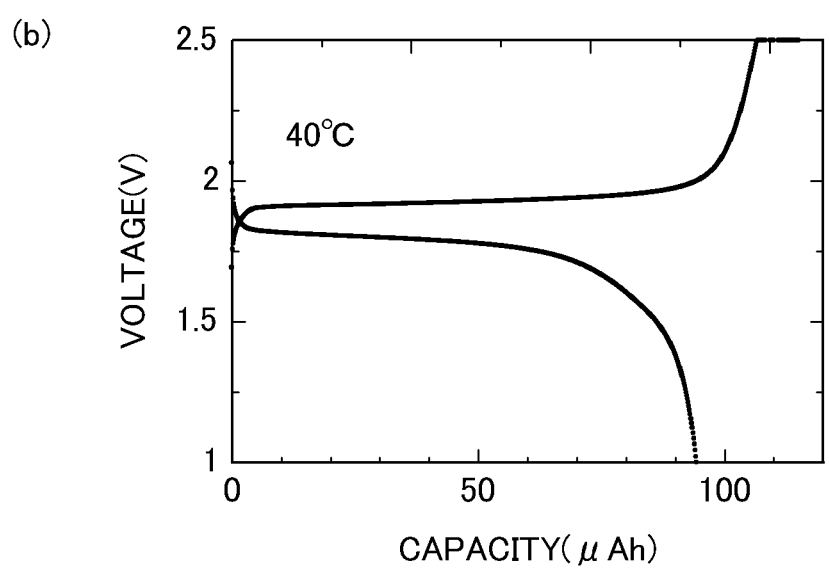

NONAQUEOUS SECONDARY BATTERY AND METHOD FOR MANUFACTURING SAME

This application is the U.S. National Phase under 35 U.S.C. § 371 of International Application PCT/JP2014/066282, filed Jun. 21, 2013, designating the U.S., and published in Japanese as WO 2014/203965 on Dec. 24, 2014, which claims priority to Japanese Patent Application No. 2013-130892, filed Mar. 29, 2013; and Japanese Patent Application No. 2013-257090 filed Dec. 12, 2013 the entire contents of which are incorporated herein by reference.

TECHNICAL FIELD

The present invention relates to a nonaqueous secondary battery and a method for manufacturing the same.

BACKGROUND ART

Along with the trend in recent years toward development of a microdevice even smaller than a small-sized device such as a portable telephone, a nonaqueous secondary battery in the micro-order is now sought after as a power source for such a microdevice. Such a nonaqueous secondary battery is required to be driven efficiently in a limited space, that is, inside a microdevice, and therefore the design of a battery is important.

Conventionally, a well-known thin-type nonaqueous secondary battery is a lithium ion secondary battery including a laminated body in which a positive current collector, a positive electrode, a separator, a negative electrode, and a negative electrode collector, having a plate structure, are laminated in that order; an electrolyte solution; and a battery case housing the laminated body and the electrolyte solution (for example, Patent Document 1).

Patent Document 1: Japanese Unexamined Patent Application, Publication No. 2012-64569

DISCLOSURE OF THE INVENTION

Problems to be Solved by the Invention

In order to make a battery of such a structure thinner, a positive electrode, a negative electrode, and the like having a plate structure may be made thinner. However, it is difficult to avoid consequent deterioration of battery performance.

The present invention has been made in view of the problems described above, and an objective of the present invention is to provide a nonaqueous secondary battery that can be made thinner without deterioration of battery performance and a method for manufacturing the nonaqueous secondary battery.

Means for Solving the Problems

The present inventors have thoroughly investigated to solve the problems described above. As a result, the present inventors have found that the above-mentioned problems can be solved by arranging a positive electrode and a negative electrode in a nonaqueous secondary battery in substantially the same plane so that respective end surfaces of the positive electrode and the negative electrode face each other at a distance, thereby completing the present invention. Specifically, the present invention provides the following.

A first aspect of the present invention relates to a nonaqueous secondary battery including: a positive electrode and a negative electrode that are arranged in substantially the same plane so that respective end surfaces of the positive electrode and negative electrode face each other at a distance; a substrate that fixingly supports the positive electrode and the negative electrode; a cover member that has gas barrier properties and defines an airtight chamber together with the substrate, the airtight chamber containing the positive electrode and the negative electrode; and an electrolyte that is housed in the airtight chamber so as to be present at least between the facing end surfaces of the positive electrode and the negative electrode, the electrolyte being involved in a battery reaction between the positive electrode and the negative electrode.

A second aspect of the present invention relates to a method for manufacturing a nonaqueous secondary battery, the method including: an electrode formation step of forming a positive electrode and a negative electrode on a substrate so that respective end surfaces of the positive electrode and negative electrode face each other at a distance; a cover member bonding step of bonding a cover member to the substrate so as to define an airtight chamber together with the substrate, the airtight chamber containing the positive electrode and the negative electrode; and an electrolyte filling step of filling the airtight chamber with an electrolyte which is involved in a battery reaction between the positive electrode and the negative electrode so that the electrolyte is present at least between the facing end surfaces of the positive electrode and the negative electrode.

A third aspect of the present invention relates to a method for manufacturing a nonaqueous secondary battery, the method including: an electrode formation step of forming a positive electrode and a negative electrode on a substrate so that respective end surfaces of the positive electrode and negative electrode face each other at a distance; an electrolyte disposing step of disposing an electrolyte involved in a battery reaction between the positive electrode and the negative electrode, at least between facing end surfaces of the positive electrode and the negative electrode; and a cover member fixing step of fixing a cover member to the substrate so that an airtight chamber containing the positive electrode and the negative electrode is defined together with the substrate, and that the airtight chamber is filled with the electrolyte; wherein the electrolyte is a gel electrolyte or a solid electrolyte.

Effects of the Invention

According to the present invention, a nonaqueous secondary battery which can be reduced in thickness without deterioration in battery performance, and a method for manufacturing the nonaqueous secondary battery can be provided.

BRIEF DESCRIPTION OF THE DRAWINGS

FIG. 1 shows diagrams schematically illustrating a nonaqueous secondary battery in accordance with an embodiment of the present invention, in which: FIG. 1A is a perspective view; FIG. 1B is a transverse sectional view illustrating a cross-section taken along line A-A of the nonaqueous secondary battery shown in FIG. 1A; and FIG. 1C is a longitudinal sectional view illustrating a cross-section taken along line B-B of the nonaqueous secondary battery shown in FIG. 1A;

FIGS. 7A to 7D are perspective views sequentially illustrating the steps of a method for manufacturing a nonaqueous secondary battery in accordance with another embodiment of the present invention;

FIGS. 8A to 8E are longitudinal sectional views sequentially illustrating the steps of a method for producing a cover member used in a part of Examples of the present invention, and FIG. 8F is a perspective view illustrating the cover member thus produced;

FIGS. 14A and 14B are graphs illustrating measurement of charge-discharge curves using a lithium ion secondary battery in accordance with another embodiment of the present invention.

PREFERRED MODE FOR CARRYING OUT THE INVENTION

Hereinafter, embodiments of the present invention are described in detail with reference to the drawings.

Figure 1:
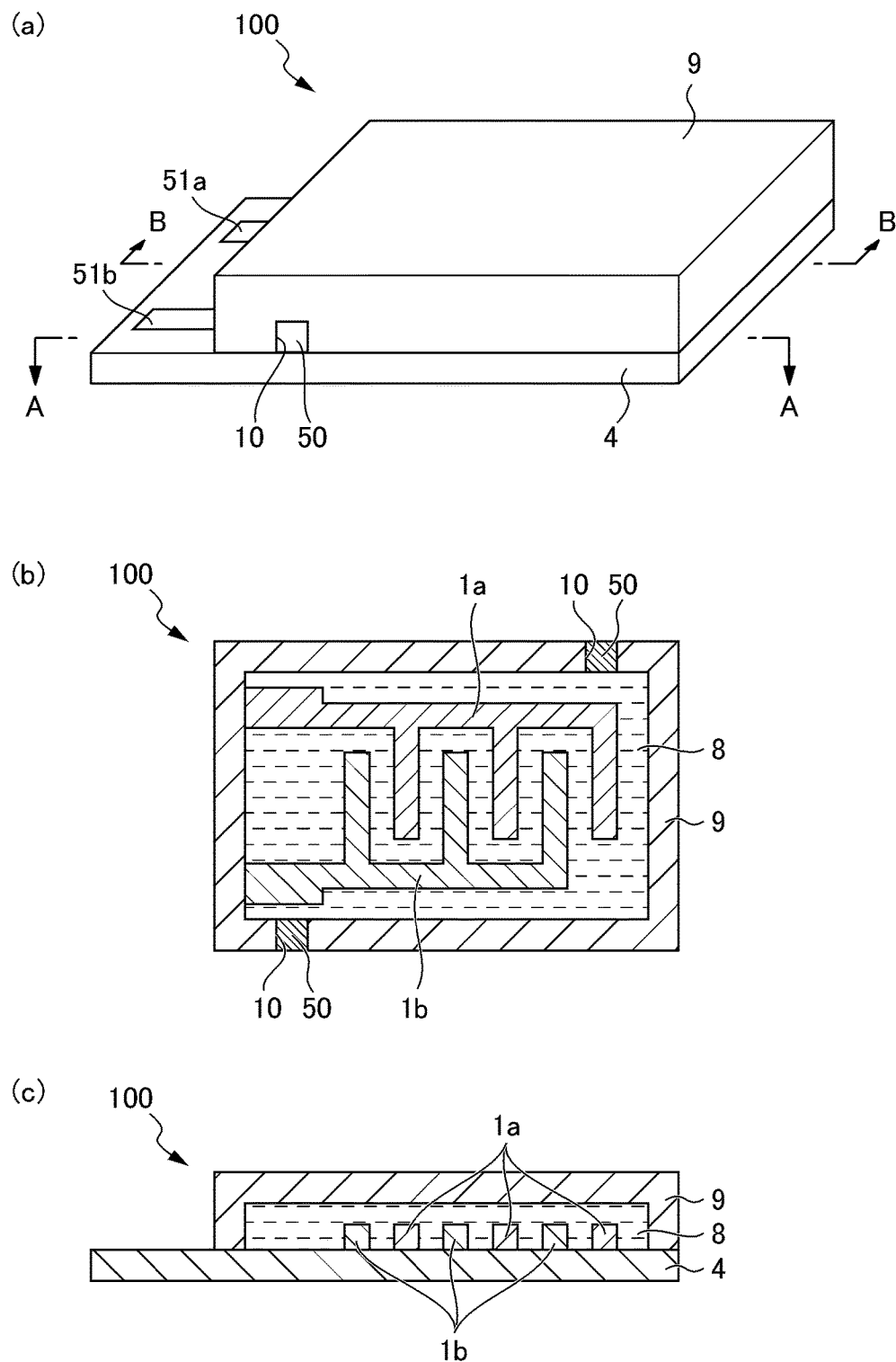

FIG. 1 shows diagrams schematically illustrating a nonaqueous secondary battery in accordance with an embodiment of the present invention, in which: FIG. 1A is a perspective view; FIG. 1B is a transverse sectional view illustrating a cross-section taken along line A-A of the nonaqueous secondary battery shown in FIG. 1A; and FIG. 1C is a longitudinal sectional view illustrating a cross-section taken along line B-B of the nonaqueous secondary battery shown in FIG. 1A;

Firstly, a nonaqueous secondary battery 100 in accordance with an embodiment of the present invention is briefly described with reference to FIG. 1. In the nonaqueous secondary battery 100, comb-shaped electrodes 1a and 1b are respectively formed into comb shapes, and oppositely disposed so that teeth parts of the comb shapes are alternately arranged. Thus, the comb-shaped electrodes 1a and 1b are disposed such that respective end surfaces thereof face each other at a distance. Herein, the comb-shaped electrode 1a is a positive electrode, and the comb-shaped electrode 1b is a negative electrode. Such a configuration of the comb-shaped electrodes 1a and 1b leads to a shorter distance between the electrodes and a constant electrolyte resistance, and thus exchange of metal ions such as lithium ions and sodium ions can be effectively performed so that battery capacitance can be increased.

Between the comb-shaped electrode 1a and the comb-shaped electrode 1b, a space or a separator (not shown) for isolating the electrodes from one another is provided, so that the electrodes are electrically separated from one other. Furthermore, a gap between the comb-shaped electrode 1a and the comb-shaped electrode 1b is filled with an electrolyte 8 involved in a battery reaction. The comb-shaped electrodes 1a and 1b are formed on the surface of a substrate 4 whose surface is a non-conductor, that is, on the same plane. As compared with a conventional nonaqueous secondary battery in which electrode members such as the positive current collector, the positive electrode, the separator, the negative electrode, and the negative electrode collector are laminated in the thickness direction thereof, even when an electrode member having the same thickness as that of a conventional battery is used, the nonaqueous secondary battery in accordance with the embodiment of the present invention can be made much thinner (for example, about ⅓).

It should be noted that the comb-shaped electrodes 1a and 1b may be arranged in substantially the same plane. As used herein, "arranged in substantially the same plane" means that a distance between a plane having the comb-shaped electrode 1a and a plane having the comb-shaped electrode 1b is more than 0 μm and not more than 10 μm, and preferably more than 0 μm and not more than 5 μm.

Examples of the substrate 4 include a silicon substrate having an oxide film on the surface thereof. It is preferable that the silicon substrate further has an adhesion imparting layer (described later) on the upper layer of the oxide film.

Furthermore, other examples of the substrate 4 include an insulating substrate or a substrate having an insulating layer, and may include a substrate having transparency or flexibility, for example, a glass substrate, a PET film, a glass film, and the like.

A cover member 9 is bonded to the substrate 4 so as to cover the comb-shaped electrodes 1a and 1b. The cover member 9, together with the substrate 4, defines an airtight chamber which contains the comb-shaped electrodes 1a and 1b. The cover member 9 has at least gas barrier properties and can be formed of a material having extremely small permeability to gas, in particular, to water vapor, for example, glass, PET, a glass film, SUS (JIS standard symbol of stainless steel material for Steel Special Use Stainless), silicon, or hydrofluoric acid-resistance oxide film made of at least one hydrofluoric acid-resistant inorganic oxide from $Al_2O_3$, $ZrO_2$, $ZnO$, $Nb_2O_5$, $Ta_2O_5$, $TiO_2$ or the like. Use of the cover member 9 having at least gas barrier properties easily suppresses the moisture absorption of the electrolyte 8, and thereby makes it easier to prevent deterioration of the nonaqueous secondary battery 100. When the nonaqueous secondary battery 100 is a metal-air secondary battery such as a lithium-air secondary battery, for example, it is preferable that an oxygen occlusion material capable of absorbing and releasing oxygen is provided on the inner side of the cover member 9. When the oxygen occlusion material is provided, charge and discharge can be carried out even if oxygen is not taken in from the outside air, and thus $H_2O$ and $CO_2$ can be prevented from being mixed into the nonaqueous secondary battery 100.

It is preferable that the cover member 9 further has hydrofluoric acid-resistance. When the electrolyte 8 such as $LiPF_6$, capable of liberating hydrofluoric acid, is used and even if hydrofluoric acid is actually liberated, the cover member 9 having hydrofluoric acid-resistance can effectively avoid corrosion and dissolution due to hydrofluoric acid. Examples of material having hydrofluoric acid-resistance include PET or the hydrofluoric acid-resistance oxide film, but even when other materials are used, the hydrofluoric acid-resistance can be imparted to the cover member 9 by vapor-depositing, via a known method, a noble metal such as gold or platinum and the hydrofluoric acid-resistant inorganic oxide to, for example, at least a part of the cover member 9 which is brought into contact with the electrolyte 8.

It should be noted that the cover member 9 has a liquid injection hole 10 as described later, and the liquid injection hole 10 is sealed with an adhesive agent 50 in the nonaqueous secondary battery 100. Furthermore, the nonaqueous secondary battery 100 is provided with terminals 51a and 51b on the substrate 4. The terminals 51a and 51b are connected to the comb-shaped electrodes 1a and 1b, respectively.

The nonaqueous secondary battery 100 is not particularly limited, and examples thereof include a metal ion secondary battery such as a lithium ion secondary battery and a sodium ion secondary battery; a metal secondary battery such as a lithium metal secondary battery; a metal-air secondary battery such as a lithium-air secondary battery, and the like.

It should be noted that in the nonaqueous secondary battery 100, when, for example, a cover member having the same shape as that of the cover member 9 and having oxygen permeability is used instead of the cover member 9 having gas barrier properties, as a metal-air secondary battery such as a lithium-air secondary battery, a secondary battery including a positive electrode and a negative electrode arranged in substantially the same plane so that respective end surfaces of the positive electrode and the negative electrode face each other at a distance; a substrate for fixing and supporting the positive electrode and the negative electrode; a cover member having oxygen permeability and defining a housing chamber, which contains the positive electrode and the negative electrode, together with the substrate; and an electrolyte which is housed in the housing chamber so as to be positioned at least between the facing end surfaces of the positive electrode and the negative electrode, and which is involved in a battery reaction between the positive electrode and the negative electrode.

Hereinafter, in particular, a case where the nonaqueous secondary battery 100 is a metal ion secondary battery is described in more detail with reference to FIGS. 1 and 2.

Figure 2:
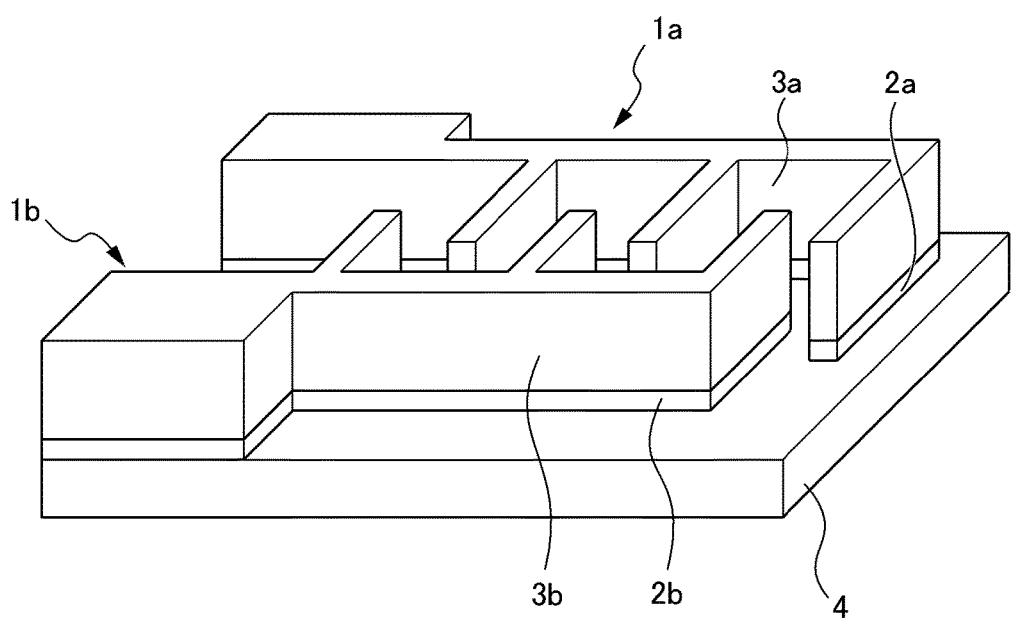
FIG. 2 is a plan view schematically illustrating comb-shaped electrodes used in a metal ion secondary battery in accordance with an embodiment of the present invention.

As shown in FIG. 2, a comb-shaped electrode 1a as the positive electrode includes a current collector 2a to draw an electric current, and a positive-electrode active material layer 3a formed on a surface of the current collector 2a. The current collector 2a is formed in a comb shape in a plan view. The positive-electrode active material layer 3a is formed on the surface of the current collector 2a, that has a comb shape seen in a plan view, similar to the current collector 2a having a comb shape.

In order to impart conductivity, the current collector 2a is constructed of metal, and the metal may be appropriately selected in consideration of the potential difference between the used positive electrode and negative electrode. The current collector 2a is preferably gold, aluminum, or the like. Then, in order to ensure the adhesion between the current collector 2a and the substrate 4, an adhesion imparting layer (not shown) is formed between the current collector 2a and the substrate 4 as necessary. The adhesion imparting layer is appropriately determined in consideration of the material of the current collector 2a and the material of the substrate 4. As an example, when the current collector 2a is constructed of gold, aluminum, or the like, and the substrate 4 is constructed of silicon, a thin film of titanium is preferably used as the adhesion imparting layer. The thickness of the current collector 2a and the thickness of the adhesion imparting layer may be optionally determined without particular limitation thereto. As an example, the thickness of the current collector 2a is 100 to 500 nm, and the thickness of the adhesion imparting layer is 50 nm to 100 nm, but they are not limited thereto.

The comb-shaped electrode 1b as a negative electrode has the current collector 2b to draw an electric current and the negative-electrode active material layer 3b formed on the surface of the current collector 2b. The other items of the comb-shaped electrode 1b are similar to those of the comb-shaped electrode 1a as the positive electrode, and therefore descriptions thereof are omitted.

As mentioned above, the electrolyte 8 is filled between the comb-shaped electrode 1a as the positive electrode and the comb-shaped electrode 1b as the negative electrode. Consequently, the comb-shaped electrode 1a and the comb-shaped electrode 1b each cause an electrode reaction, and the current can be drawn from the current collector 2a and the current collector 2b.

The entire size of comb-shaped electrodes; the thickness, length, and number of teeth in the comb-shaped electrode 1a or the comb-shaped electrode 1b; the space between two adjacent teeth; the thickness of active material layers, or the like may be appropriately adjusted depending on the desired charge capacity and discharge capacity. For example, the thickness of teeth may be 10 to 50 μm, the space between two adjacent teeth may be 30 to 70 μm, and the thickness of active material layers may be 10 to 50 μm. It should be noted that when a transparent substrate is used as the substrate 4 and a transparent member is used as the cover member 9, by changing at least one of the thickness of teeth, length of teeth, number of teeth, and space between teeth, the optical transparency of the nonaqueous secondary battery 100 can be appropriately changed. In a region in which the teeth of the comb-shaped electrode 1a and the comb-shaped electrode 1b are alternately arranged seen in the direction perpendicular to the direction of the length of teeth in the comb-shaped electrode 1a and comb-shaped electrode 1b and in the direction parallel to the substrate 4, an area ratio of a transmission portion to the total area of the teeth of the comb-shaped electrode 1a, the teeth of the comb-shaped electrode 1b, and a gap between the teeth of the comb-shaped electrode 1a and the teeth of the comb-shaped electrode 1b (transmission portion) is preferably, for example, 40 to 95%.

Material of the positive-electrode active material layer 3a and the negative-electrode active material layer 3b, as well as the type of electrolyte 8, are appropriately determined from those that can be employed for a metal ion secondary battery such as a lithium ion secondary battery and a sodium ion secondary battery. For example, when the metal ion secondary battery is a lithium ion secondary battery, examples of the material to configure the positive-electrode active material layer 3a include transition metal oxide such as lithium cobaltate; examples of the material to configure the negative-electrode active material layer 3b include carbon, graphite, lithium titanate, etc.; and examples of the electrolyte 8 include electrolyte liquids containing a lithium salt such as lithium perchlorate, lithium hexafluorophosphate, and lithium bis(trifluoromethylsulfonyl)imide, and an organic solvent in which the lithium salt is soluble and which contains carbonate ester compounds such as ethylene carbonate, dimethyl carbonate, and diethyl carbonate, acetonitrile, and a mixture solution of two or more of these; gel-like electrolytes containing the above-mentioned electrolyte liquids and polymers such as polyethylene oxide, polypropylene oxide, polyacrylonitrile, and polymethacrylonitrile; and solid electrolytes obtained by cross-linking the above-mentioned polymers in a solid electrolyte precursor including the above-mentioned lithium salts, the above-mentioned polymers, and a polymerization initiator such as azobisisobutyronitrile. Furthermore, for example, when the metal ion secondary battery is a sodium ion secondary battery, examples of the material to configure the positive-electrode active material layer 3a include transition metal oxide such as sodium cobaltate; examples of the material to configure the negative-electrode active material layer 3b include carbon, graphite, sodium titanate, etc.; and examples of the electrolyte 8 include electrolyte liquids containing a sodium salt such as sodium perchlorate, sodium hexafluorophosphate, and sodium bis(trifluoromethylsulfonyl)imide, and an organic solvent in which the sodium salt is soluble and which contains carbonate ester compounds such as ethylene carbonate, dimethyl carbonate, and diethyl carbonate, acetonitrile, and a mixture solution of two or more of these; gel-like electrolytes containing the above-mentioned electrolyte liquids and polymers such as polyethylene oxide, polypropylene oxide, polyacrylonitrile, and polymethacrylonitrile; and solid electrolytes obtained by cross-linking the above-mentioned polymers in a solid electrolyte precursor including the above-mentioned sodium salts, the above-mentioned polymers, and a polymerization initiator such as azobisisobutyronitrile. Occurrence of liquid leakage from the resulting secondary batteries can be effectively reduced by use of the above-mentioned gel-like electrolyte or solid electrolyte as the electrolyte 8.

More specifically, when the metal ion secondary battery is a lithium ion secondary battery, examples of the active material include particles of positive-electrode active materials such as $LiCoO_2$, $LiFePO_4$, and $LiMn_2O_4$ and particles of negative-electrode active materials such as graphite, $Li_4Ti_5O_{12}$, Sn alloys, and Si-based compounds. Furthermore, when the metal ion secondary battery is a sodium ion secondary battery, examples of the active material include particles of positive-electrode active materials such as $NaCoO_2$, $NaFePO_4$, and $NaMn_2O_4$, and particles of negative-electrode active materials such as graphite, $Na_4Ti_5O_{12}$, Sn alloys, and Si-based compounds. When forming the active material layer, preferably, the active material is used in the state of a dispersion liquid where the active material is dispersed in a dispersion medium. The dispersion medium used may be, for example, water, acetonitrile, N-methylpyrrolidone, acetone, ethanol, and the like. Preferably, the amount of the dispersion medium used is an amount that leads to 35 to 60 mass % of solid content concentration in the dispersion liquid.

The dispersion liquid typically contains a binder such as styrene-butadiene rubber (SBR) and polyvinylidene fluoride. The dispersion liquid may further contain a conductive aid such as carbon black (for example, acetylene black) and a dispersant such as carboxymethylcellulose. The contents of the active material, binder, conductive aid, and dispersant in the solid content of the dispersion liquid are not particularly limited. In the solid content of the dispersion liquid, the content of the active material is preferably 75 to 99 mass % and more preferably 80 to 98 mass %; the content of the binder is preferably 1 to 15 mass %; the content of the conductive aid is preferably 0 to 9 mass %; and the content of the dispersant is preferably 0 to 7 mass %. Particularly, when the content of the conductive aid is within the above-mentioned range, belt-like residue of active materials extending in a squeegee-moving direction is unlikely to appear on the surface of the resist layer 12 or 15 during filling the dispersion liquid into the guide hole 13a or 13b by a screen printing process in the below-mentioned step shown in FIG. 5D or 5G or FIG. 6D or 6H, and also whisker-like residue of active materials is unlikely to appear in the resulting comb-shaped electrodes, thereby short circuiting between electrodes can be effectively prevented.

In the electrolyte 8, the content of the salt is preferably adjusted such that the concentration of a metal atom (for example, lithium atom or sodium atom) constituting the salt is 0.2 to 2.0 M. In the above-mentioned gel-like electrolyte, preferably, the content of the polymer is 2 to 80 mass %. The electrolyte 8 may further contain an additive including unsaturated cyclic carbonate ester compounds such as vinylene carbonate, halogen-substituted carbonate ester compounds such as fluoroethylene carbonate, cyclic sulfonate-based compounds such as 1,3-propane sultone, cyclic sulfite ester compounds such as ethylene sulfite, crown ethers such as 12-crown-4, and aromatic compounds such as benzene and toluene. When the electrolyte 8 contains one of the above additives, operating life of the resulting secondary battery tends to be longer. The concentration of the additive is preferably 0.1 to 20 mass % in the electrolyte 8.

Next, a method for manufacturing the nonaqueous secondary battery 100 in accordance with an embodiment of the present invention is described. The method for manufacturing the nonaqueous secondary battery 100 in accordance with the embodiment includes at least an electrode formation step, a cover member bonding step, and an electrolyte filling step. Hereinafter, each step is described with reference to FIGS. 3A to 3D.

[Electrode Formation Steps]

Figure 3:
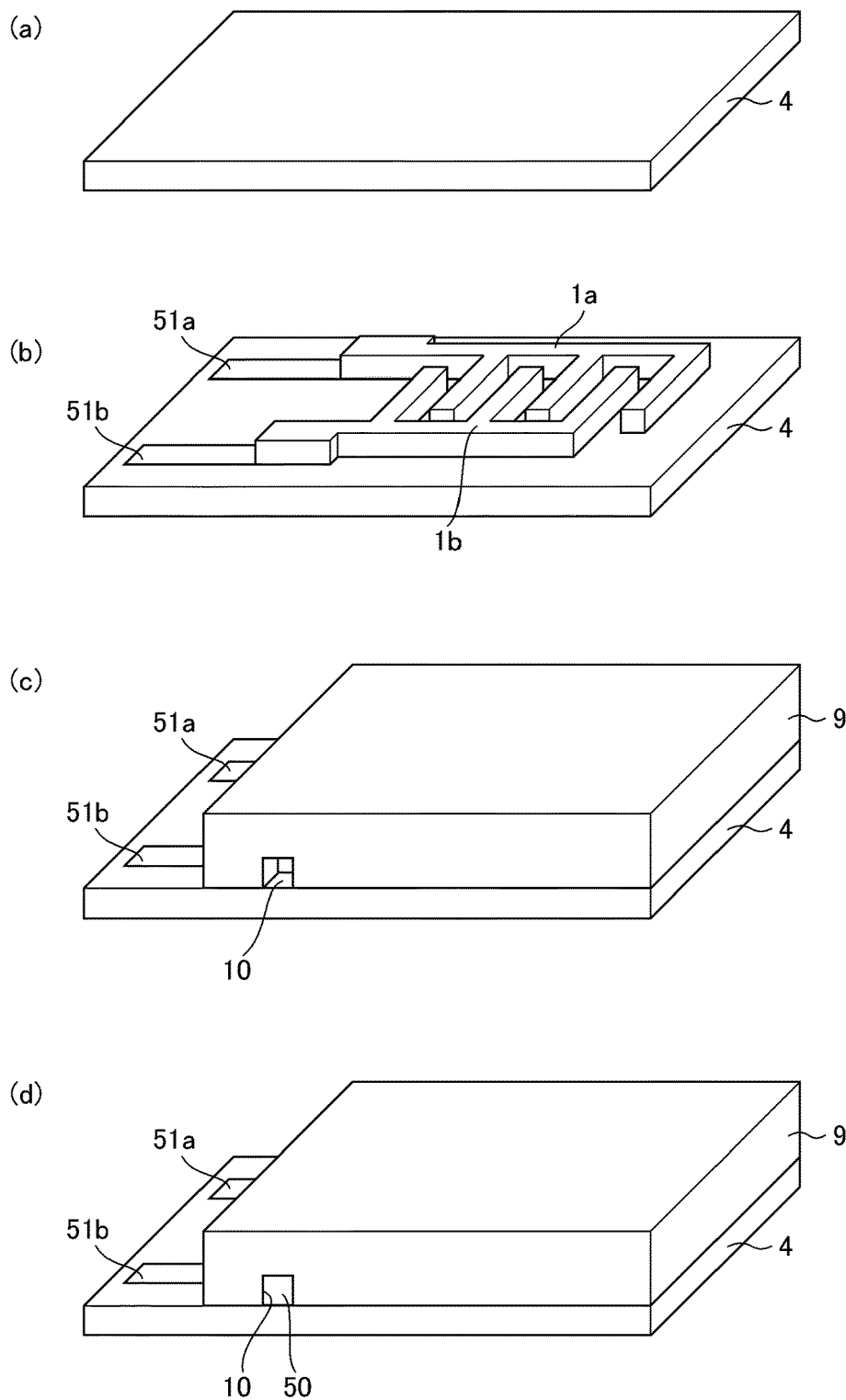
FIGS. 3A to 3D are perspective views sequentially illustrating the steps of a method for manufacturing a nonaqueous secondary battery in accordance with an embodiment of the present invention.

Electrode formation steps are steps sequentially shown in FIGS. 3A and 3B.

In this step, comb-shaped electrodes 1a and 1b are formed on the surface of a substrate 4. Formation of the comb-shaped electrodes 1a and 1b can be carried out by a well-known method including, for example, a screen printing process, a metal spraying process, a plating process, a vapor deposition method, a sputtering process, an ion plating process, a plasma CVD method, and a combination of two or more of these processes.

Furthermore, when the nonaqueous secondary battery 100 is a metal ion secondary battery such as a lithium ion secondary battery and a sodium ion secondary battery, it is preferable that the electrode formation step includes a current collector formation step, a resist application step, a guide hole formation step, and an active material layer formation step. Hereinafter, in particular, each step in the electrode formation steps is described with reference to FIGS. 4A to 4I with attention focused on a case where the nonaqueous secondary battery 100 is a lithium ion secondary battery. It should be noted that also when the nonaqueous secondary battery 100 is a metal ion secondary battery other than a lithium ion secondary battery, such as a sodium ion secondary battery, similar to the case where the nonaqueous secondary battery 100 is a lithium ion secondary battery, electrodes can be formed by the electrode formation step including a current collector formation step, a resist application step, a guide hole formation step, and an active material layer formation step mentioned below.

(Current Collector Formation Step)

Current collector formation steps are steps sequentially shown in FIGS. 4A to 4F.

Figure 4:
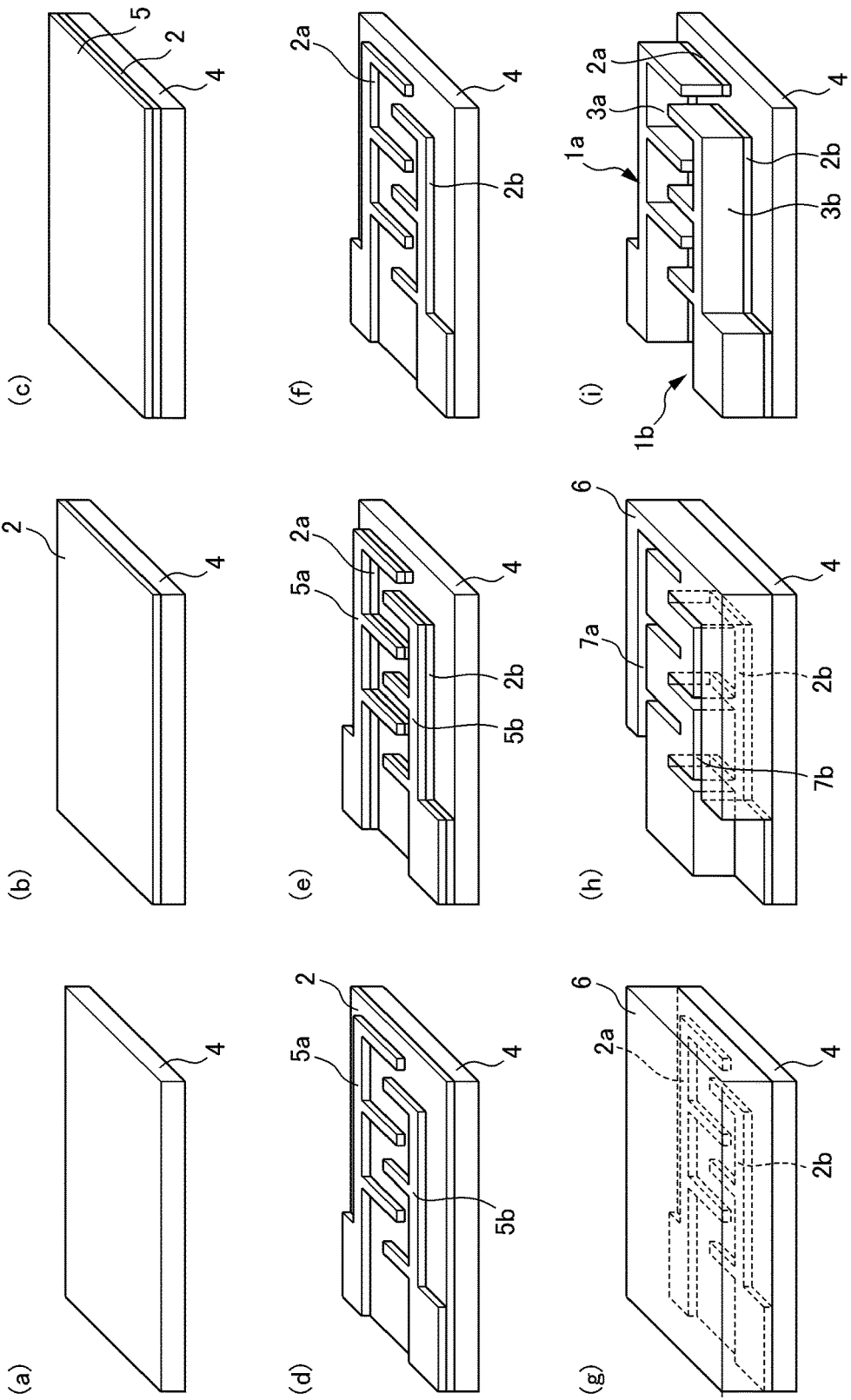
FIGS. 4A to 4I are perspective views sequentially illustrating the steps of a method for manufacturing a comb-shaped electrode used in a lithium ion secondary battery in accordance with an embodiment of the present invention.

In this step, firstly, a thin-film conductive layer 2 is formed on the surface of the substrate 4 (FIGS. 4A to 4B). The substrate 4 is a non-conductor or a conductor or semiconductor provided with a non-conductor layer on at least a surface thereof, and examples of the substrate 4 include a silicon substrate having an oxide film on the surface thereof, and also a glass substrate, a PET film, and the like. The conductive layer 2 is a conductor, and preferably a metal thin film. In order to form the conductive layer 2 on the surface of the substrate 4, various well-known processes including a vapor deposition process such as a PVD process or a CVD process, a sputtering process, a plating process, a metal foil adhesion process, and the like can be used. The thickness of the conductive layer 2 may be appropriately determined in consideration of performance required of the electrodes 1a and 1b.

For example, when the substrate 4 is a silicon substrate having an oxide film on the surface thereof, and the conductive layer 2 is formed of a thin film of gold or aluminum, an exemplified method is a method including firstly forming a thin film (not shown) of titanium on the surface of the silicon substrate 4 by the sputtering process, and then forming the thin film of gold or aluminum as the conductive layer 2 on the surface of the thin film of titanium by the sputtering process. In this case, the thin film of titanium is provided in order to improve the adhesion of the conductive layer 2 to the silicon substrate 4. The thicknesses of the thin film of titanium and the conductive layer 2 are, for example, 100 to 500 nm, and the thickness of the adhesion imparting layer is, for example, 50 nm to 100 nm, but the thicknesses may be appropriately determined in consideration of required performance.

After the conductive layer 2 is formed, as shown in FIG. 4C, a current collector-formation resist is applied to the surface of the conductive layer 2 so as to form a current collector-formation resist layer 5. The current collector-formation resist layer 5 is provided in order to pattern the conductive layer 2 and to form comb-shaped current collectors 2a and 2b.

As the current collector-formation resist, well-known various resist compositions can be used. It should be noted that the term "current collector-formation resist" is used to discriminate this resist from a resist used for forming guide holes 7a and 7b mentioned later. The current collector-formation resist may be the same as or different from the resist to be used in a guide hole formation step mentioned later.

Well-known methods may be used for the method for applying the current collector-formation resist, without particular limitation thereto. Such methods include a spin coating process, a dipping process, a brush application process, and the like.

The formed current collector-formation resist layer 5 is selectively exposed and developed through a comb-shaped mask pattern, and made into resin patterns 5a and 5b for forming the current collector. Thus, as shown in FIG. 4D, the resin patterns 5a and 5b for forming the current collector are formed on the surface of the conductive layer 2. The number of teeth, the thickness of teeth, a gap between the patterns (a space gap), and the like in the comb-shaped resin patterns 5a and 5b may be appropriately determined in consideration of required performance. The number of teeth may be, for example, 5 to 500 pairs; the thickness of teeth may be, for example, 1 to 50 μm; the space gap may be, for example, 1 to 50 μm, respectively. As an example, the number of teeth is 100 pairs (the number of teeth of one side of the resin pattern is 100), the thickness of teeth is 20 μm, and the space gap is 10 to 20 μm, but these dimensions are not limited thereto.

Next, a part which is not covered with the patterns 5a and 5b of the conductive layer 2 is removed. The conductive layer 2 can be removed by using a well-known method without particular limitation. Examples of such methods include an etching process, an ion milling process, and the like. When the part which is not covered with the patterns 5a and 5b of the conductive layer 2 is removed, the comb-shaped current collectors 2a and 2b are formed (FIG. 4E). Thereafter, the patterns 5a and 5b are removed, and then the comb-shaped current collectors 2a and 2b are exposed on the surface of the substrate 4 as shown in FIG. 4F.

(Resist Application Step)

Next, a resist application step will be described. The resist application step is a step carried out after the above-mentioned current collector formation step and is shown in FIG. 4G.

In this step, a resist composition is applied to the surface of the substrate 4 including the parts of the current collectors 2a and 2b formed in the above-mentioned current collector formation step to form a resist layer 6.

Well-known methods can be used to form the resist layer 6 by applying the resist composition to the surface of the substrate 4, without particular limitation thereto. In the resist layer 6, the guide holes 7a and 7b are formed in order to form the positive-electrode active material layer 3a and the negative-electrode active material layer 3b, as described below. The guide holes 7a and 7b become a casting mold when forming the positive-electrode active material layer 3a and the negative-electrode active material layer 3b and thus are required to have a sufficient depth for forming the positive-electrode active material layer 3a and the negative-electrode active material layer 3b. The thickness of the resist layer 6 becomes the future depth of the guide holes 7a and 7b and thus is appropriately determined in consideration of the necessary depth of the guide holes 7a and 7b. The thickness of the resist layer 6 may be, for example, 10 to 100 μm, but is not particularly limited thereto.

As the resist composition used for forming the resist layer 6, any of (1) to (4) is used: (1) a cationic polymerization resist composition including a compound having an epoxy group and a cationic polymerization initiator, (2) a novolac resist composition including novolac resin and a photosensitizing agent, (3) a chemical amplification resist composition including resin, which has an acid dissociation leaving group and has alkali-solubility increased by the effect of acids generated from a photoacid generator by exposure of the leaving group, and a photoacid generator, or (4) a radical polymerization resist composition including a monomer and/or resin having an ethylenic unsaturated bond, as well as a radical polymerization initiator, wherein when the monomer having an ethylenic unsaturated bond is included, the number of ethylenic unsaturated bonds included in one molecule of the monomer is three or less. Hereinafter, for each resist composition, well-known compositions can be used.

(Guide Hole Formation Step)

Next, a guide hole formation step will be described. The guide hole formation step is a step carried out after the above-mentioned resist application step, and is shown in FIG. 4H. It should be noted that in FIG. 4H, for easy understanding of the drawing, a current collector 2a located in the bottom part of the guide hole 7a is omitted.

In this embodiment, in this step, the guide holes 7a and 7b having the same shape in a plan view as those of the comb-shaped current collectors 2a and 2b are formed on the resist layer 6 formed in the above-mentioned resist application step. Guide holes 7a and 7b are formed as through-holes penetrating the resist layer 6 to the surfaces of the current collectors 2a and 2b. The guide holes 7a and 7b are used as a casting mold to deposit a positive electrode or a negative electrode active material in the active material layer formation step described later.

In this embodiment, in this step, firstly, the resist layer 6, which has been formed in the above-mentioned resist application step, is selectively exposed and developed through a mask having the same shape in a plan view as the shapes of the current collectors 2a and 2b. Consequently, when the resist layer 6 is formed of negative-type resist, a part not to be the future guide holes 7a and 7b is hardened and becomes insoluble to a developer, and a part to be the future guide holes 7a and 7b retains its solubility to the developer. Furthermore, when the resist layer 6 is formed of positive-type resist, the part to be the future guide holes 7a and 7b is soluble to a developer, and a part not to be the future guide holes 7a and 7b retains its insolubility to the developer.

The selectively exposed resist layer 6 is developed. The development can be carried out by well-known methods using well-known developers. Examples of such a developer include alkaline aqueous solutions. Furthermore, examples of the development processes include an immersion process, and a spraying process, and the like.

The guide holes 7a and 7b having the same shape in a plan view as those of the comb-shaped current collectors 2a and 2b and penetrating up to the surface of the current collectors 2a and 2b are formed in the developed resist layer 6. As necessary, after-curing by irradiation with an active energy beam such as UV rays or post-baking as additional heat treatment is applied to the resist layer 6 where the guide holes 7a and 7b have been formed. Solvent resistance and plating solution resistance of the resist layer 6 necessary in the active material layer formation step, as described later, are further improved by performing the after-curing or post-baking.

(Active Material Layer Formation Step)

Next, an active material layer formation step will be described. The active material layer formation step is a step carried out after the above-mentioned guide hole formation step, and is shown in FIG. 4I.

In this step, the positive-electrode active material layer 3a is formed on the surface of the current collector 2a and the negative-electrode active material layer 3b is formed on the surface of the current collector 2b using the guide holes 7a and 7b, which have been formed in the above-mentioned guide hole formation step, as a casting mold, respectively. Thus, the electrodes 1a and 1b are completed.

Methods for forming the active material layers 3a and 3b on the surfaces of the current collectors 2a and 2b using the guide holes 7a and 7b a as a casting mold include electrophoresis or a plating process. These processes are described hereinafter.

Electrophoresis is a method including: immersing the substrate 4 provided with the guide holes 7a and 7b in a polar solvent in which positive or negative electrode active material particles are dispersed, and applying a voltage to either the current collector 2a or 2b, thereby selectively depositing the positive or negative electrode active material particles dispersed in the solvent on the surface of the current collector to which the voltage has been applied. Thereby, it is possible to deposit the active material layer 3a or 3b on either the current collector 2a or 2b using the guide hole 7a or 7b as a casting mold.

Examples of the active materials to be dispersed in the solvent include particles of positive-electrode active materials such as $LiCoO_2$, $LiFePO_4$, and $LiMn_2O_4$ and particles of negative-electrode active materials such as graphite, $Li_4Ti_5O_{12}$, Sn alloys, and Si-based compounds, having a particle diameter of 100 to 10000 nm, and preferably 100 to 1000 nm. Furthermore, an amount of the active material to be dispersed in the solvent is, for example, 1 to 50 g/L, and the solvent to be used is, for example, acetonitrile, N-methyl-pyrrolidone, acetone, ethanol, or water. Furthermore, a conductive aid and a binder, for example carbon black, polyvinylidene fluoride, and iodine, may be added to the solvent. The amount of the conductive aid and the binder in the solvent is, for example, 0.1 to 1 g/L, respectively.

When electrophoresis is carried out, a substrate of nickel or gold or the like is used as a counter electrode in a position about 1 cm above the current collector 2a or 2b to carry out the electrophoresis. At that time, a voltage is, for example, 1 to 1000 V. The electric field density is, for example, 1 to 1000 V/cm applied between the current collectors 2a and 2b, or between the current collector 2a or 2b and the counter electrodes to the current collector 2a or 2b.

The plating process is a method for forming the active material layer 3a or 3b on the surface of the current collector 2a or 2b using a water-soluble plating solution. Examples of such a plating solution include 0.01 to 0.3 M aqueous solution of $SnCl_2.2H_2O$, 0.01 to 0.3 M aqueous solution of a mixture of $SnCl_2.2H_2O$ and $NiCl_2.6H_2O$, 0.01 to 0.3 M aqueous solution of a mixture of $SnCl_2.2H_2O$ and $SbCl_3$, 0.01 to 0.3 M aqueous solution of a mixture of $SnCl_2.2H_2O$ and $CoCl_2$, and 0.01 to 0.3M aqueous solution of a mixture of $SnCl_2.2H_2O$ and $CuSO_4$. Furthermore, to the plating solution, glycine, $K_4P_2O_7$, $NH_4OH$ aqueous solution, and the like may be added as additives at a concentration of, for example, 0.01 to 0.5 M.

Although not particularly limited, after the active material layer 3a or 3b is selectively formed on either the current collector 2a or 2b by the above-mentioned electrophoresis, the active material layer 3b or 3a may be selectively formed on the other of the current collector 2b or 2a on which the active material layer 3a or 3b is not formed by the above-mentioned plating process. Thus, the positive-electrode active material layer 3a is selectively formed on the surface of the current collector 2a, and the negative-electrode active material layer 3b is selectively formed on the surface of the current collector 2b, respectively.

Furthermore, in the formation of the active material layer 3a or 3b on the surface of the current collector 2a or 2b, in addition to the electrophoresis or the plating process mentioned above, an injection process can be carried out as necessary, wherein the solution, in which the positive electrode active material particles or the negative electrode active material particles are dispersed in the above-mentioned solvent, is injected into the guide hole 7a or 7b using a capillary.

As mentioned above, the active material layers 3a and 3b are formed by the electrophoresis or the plating process using the guide holes 7a and 7b formed on the resist layer 6 as a casting mold. Consequently, it is preferable that the resist layer 6 in the active material layer formation step has resistance to a solvent used in electrophoresis and a plating solution used in the plating process. Based on this point, among the resist compositions exemplified in the above (1) to (4), from the viewpoint of imparting resistance to the plating solution, (1) a cationic polymerization resist composition, (2) a novolac resist composition, or (3) a chemical amplification resist composition is preferable. Among the resist compositions of (1) to (3), from the viewpoint of imparting resistance to the solution to be used in the above-mentioned electrophoresis, (1) the cationic polymerization resist composition is more preferable.

After the active material layers 3a and 3b are formed on the surfaces of the current collectors 2a and 2b, respectively, the resist layer 6 provided with the guide holes 7a and 7b is removed. Thus, the electrodes 1a and 1b shown in FIG. 2 are formed. Methods for removing the resist layer 6 include an ashing process of decomposing the resist layer 6 by heating at a high temperature, and an etching process.

It should be noted that procedures in the above-mentioned resist application step, guide hole formation step, and active material layer formation step can also be executed by a below-mentioned first or second pattern formation method. That is to say, the comb-shaped electrodes 1a and 1b can be produced by, for example, forming the current collectors 2a and 2b in the current collector formation step, and forming the positive and negative electrodes on the current collectors 2a and 2b by using the first or second pattern formation method mentioned below.

First Pattern Formation Method

A first pattern formation method is a pattern formation method in which n patterns (n: an integer of at least 2, and preferably 2) of identical or different pattern materials are formed on a support, and the method includes: forming a first resist layer by applying a positive-type resist composition to a surface of the support, the following steps of (1) to (3) are repeated for a kth pattern material and a kth resist layer in an order from k=1 to k=(n−1) (k: an integer of 1 to (n−1)): (1) forming a guide hole penetrating through the first to the kth resist layers by exposure and development; (2) filling a kth pattern material into the above-mentioned guide hole by a screen printing process; and (3) forming a (k+1)th resist layer by applying a positive-type resist composition to the kth resist layer and the kth pattern material which has been filled into the guide holes, thus forming a guide hole penetrating the first to the nth resist layers by exposure and development, filling a nth pattern material into the guide hole by a screen printing process, and removing the first to the nth resist layers. According to the first pattern formation method, a plurality of patterns of identical or different pattern materials can be formed on the support for a short time.

Hereinafter, the first pattern formation method is described in detail with reference to the drawings.

FIGS. 5A to 5H are longitudinal sectional views showing the first pattern formation method. With reference to FIGS. 5A to 5H, a pattern formation method in accordance with an embodiment of the present invention is described. It should be noted that the case of n=2 is described in FIGS. 5A to 5H.

Initially, in the step shown in FIG. 5B, the first resist layer 12 is formed by applying a positive-type resist composition to the surface of the support 11 shown in FIG. 5A.

Well-known methods can be used for the process to form the first resist layer 12 by applying the positive-type resist composition to the surface of the support 11, without particular limitation thereto. In the first resist layer 12, guide holes 13a and 13b are formed in order to form the pattern material layers 14a and 14b, as will be described later. The guide holes 13a and 13b become a casting mold when forming the pattern material layers 14a and 14b and thus are required to have a sufficient depth for forming the pattern material layers 14a and 14b. The thickness of the first resist layer 12 becomes the future depth of the guide holes 13a and 13b and thus is appropriately determined in consideration of the necessary depth of the guide holes 13a and 13b. The thickness of the first resist layer 12 may be, for example, 10 to 100 μm, but is not particularly limited thereto.

The positive-type resist composition used for forming the first resist layer 12 may be well-known compositions without particular limitation thereto, and may be non-chemical amplification type or chemical amplification type compositions. Examples of the non-chemical amplification type positive-type resist composition include those containing at least a quinone diazide group-containing compound (A) and an alkali-soluble resin (B). On the other hand, examples of the chemical amplification-type positive-type resist composition may include those containing at least a photoacid generator and a resin which has an acid-dissociating elimination group and increases alkali solubility when the elimination group is eliminated by action of an acid generated from the photoacid generator through exposure.

Next, the step shown in FIG. 5C is described.

In this step, initially, the first resist layer 12 is selectively exposed through a desired mask. Consequently, the part to be the future guide hole 13a becomes soluble to a developer, and the part not to be the future guide hole 13a retains its insolubility to the developer.

The selectively exposed first resist layer 12 is developed. The development can be carried out by well-known processes using well-known developers. The developer may be, for example, an alkaline aqueous solution. Furthermore, the development processes may be, for example, an immersion process, a spray process, and the like.

The guide hole 13a penetrating up to the surface of the support 11 is formed in the developed first resist layer 12. The guide hole 13a is used as a casting mold in order to deposit a pattern material in the step shown in FIG. 5D (described later). As necessary, after-curing by irradiation with an active energy beam such as UV rays or post-baking as additional heat treatment is applied to the first resist layer 12 where the guide hole 13a has been formed. Solvent resistance and plating solution resistance of the first resist layer 12 necessary at the step of filling the pattern material, as described later, are further improved by applying the after-curing or post-baking.

Next, the step shown in FIG. 5D is described.

In this step, a first pattern material is filled into the guide hole 13a formed in the step shown in FIG. 5C by a screen printing process. That is, the first pattern material layer 14a is formed on the surface of the support 11 using the guide hole 13a as a casting mold.

The screen printing process can be carried out using, for example, a commercially available screen printer while appropriately adjusting squeegee pressure; squeegee speed; and material, hardness, grinding angle, etc. of the squeegee used.

Next, the step shown in FIG. 5E is described.

In this step, a positive-type resist composition is applied to the first resist layer 12 and the first pattern material (that is, the first pattern material layer 14a) filled into the guide hole 13a so as to form a second resist layer 15. The second resist layer 15 functions as a protective layer of the first pattern material layer 14a. That is to say, if the guide hole 13b is formed without forming the second resist layer 15 as described later, the first pattern material layer 14a is brought into contact with the developer and flows out in the process. As described above, formation of the second resist layer 15 can prevent the first pattern material layer 14a from being brought into contact with the developer and flowing out.

The type and coating process of the positive-type resist composition are similar to those described above as to the step shown in FIG. 5B. The positive-type resist composition used in the step shown in FIG. 5E may be the same as the positive-type resist composition used in the step shown in FIG. 5B, but is preferably different therefrom in terms of composition component or type.

The thickness of the second resist layer 15 is not particularly limited as long as its function as the protective layer for the first pattern material layer 14a is assured, and it is appropriately determined in consideration of the depth required for the guide hole 13b formed in the step shown in FIG. 5F mentioned later and it may be, for example, 1 to 20 μm.

Next, the step shown in FIG. 5F is described.

In this step, initially, the first resist layer 12 and the second resist layer 15 are selectively exposed through a desired mask. Consequently, the part to be the future guide hole 13b becomes soluble to a developer, and the part not to be the future guide hole 13b retains its insolubility to the developer.

The selectively exposed first resist layer 12 and second resist layer 15 are developed. The developer and the developing process are similar to those described in terms of the step shown in FIG. 5C.

The guide hole 13b penetrating up to the surface of the support 11 is formed in the developed first resist layer 12 and second resist layer 15. The guide hole 13b is used as a casting mold in order to deposit a pattern material in the step shown in FIG. 5G (described later). As necessary, after-curing by irradiation with an active energy beam such as UV rays or post-baking as additional heat treatment is applied to the first resist layer 12 and the second resist layer 15 where the guide hole 13b has been formed. Solvent resistance and plating solution resistance of the first resist layer 12 and the second resist layer 15 necessary at the step of filling the pattern material, as described later, are further improved by applying the after-curing or post-baking.

Next, the step shown in FIG. 5G is described.

In this step, a second pattern material is filled into the guide hole 13b formed in the step shown in FIG. 5F by a screen printing process. That is, the second pattern material layer 14b is formed on the surface of the support 11 using the guide hole 13b as a casting mold.

The conditions of the screen printing process are similar to those described in terms of the step shown in FIG. 5D.

Next, the step shown in FIG. 5H is described.

In this step, the first resist layer 12 and the second resist layer 15 are removed. Specifically, for example, a method of stripping these resist layers using a stripping liquid is employed. In this case, the stripping process is not particularly limited, and immersion processes, spray processes, shower processes, puddle processes, or the like may be used. Additionally, examples of the stripping liquid include 3 to 15 mass % aqueous solution of sodium hydroxide, aqueous solution of potassium hydroxide, organic amines, tetramethyl ammonium hydroxide, triethanolamine, N-methylpyrrolidone, dimethyl sulfoxide, acetone, and the like. The stripping treatment time may be, for example, about 1 to 120 minutes without particular limitation thereto. It should be noted that the stripping liquid may be warmed to about 25 to 60° C.

As mentioned above, two patterns composed of the first and second pattern materials can be formed on the support.

Figure 5:
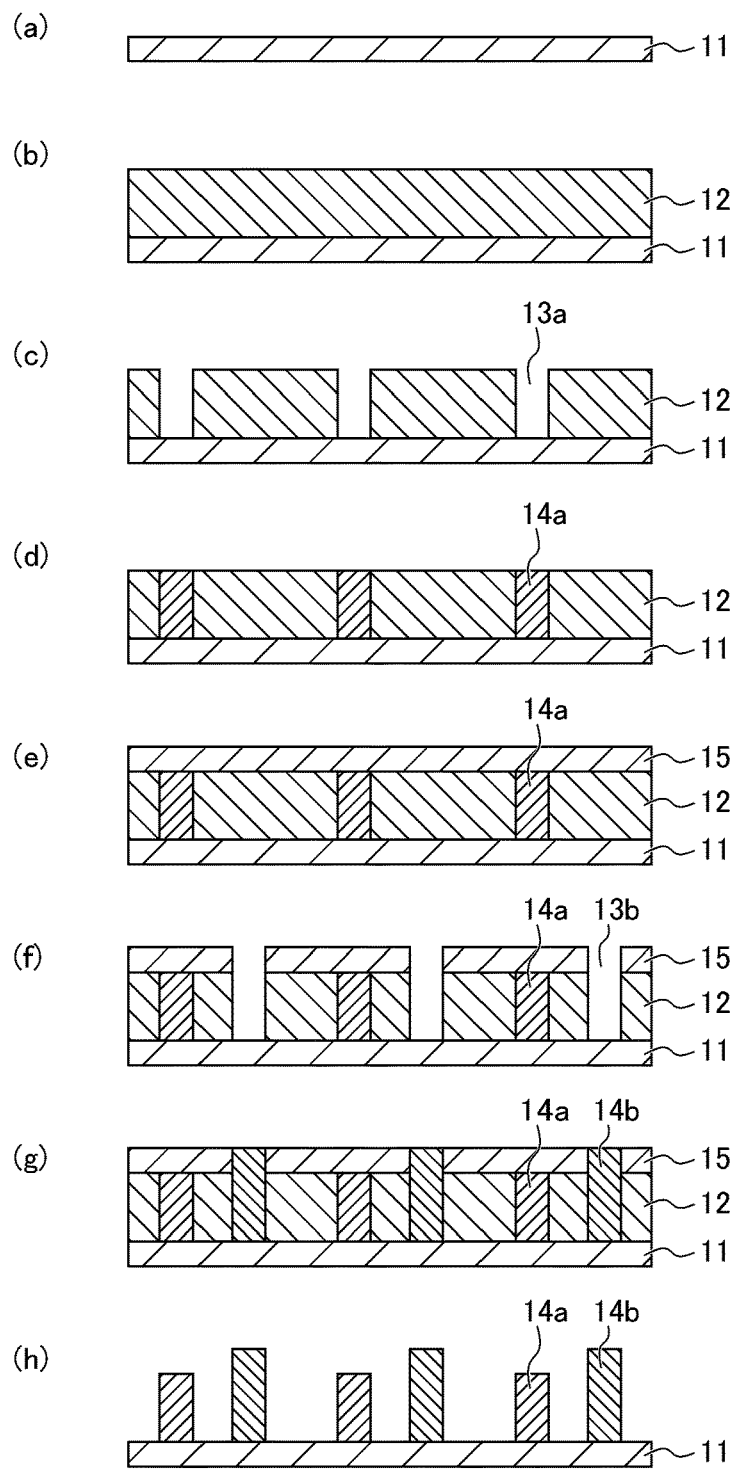
FIG. 5 shows longitudinal sectional views illustrating a first pattern formation method used in a method for manufacturing a comb-shaped electrode used in a lithium ion secondary battery in accordance with an embodiment of the present invention.

It should be noted that in FIG. 5, the case of n=2 is described, but in the case where n is 3 or more, steps shown in FIGS. 5C to 5E are repeated a necessary amount of times, and n patterns composed of identical or different pattern materials can be formed on the support.

The positive electrode and the negative electrode can be formed on the current collectors 12a and 12b by carrying out patterning according to FIG. 5, for example, using the current collectors 12a and 12b in FIG. 2 as the support 11 in FIG. 5, using the positive-electrode active material layer 13a in FIG. 2 as the first pattern material layer 14a in FIG. 5, and using the negative-electrode active material layer 13b in FIG. 2 as the second pattern material layer 14b in FIG. 5.

Second Pattern Formation Method

A second pattern formation method is a pattern formation method in which n patterns (n: an integer of at least 2, and preferably 2) of identical or different pattern materials are formed on a support, and the method includes: forming a first resist layer by applying a resist composition to a surface of the support, the following steps of (1) to (4) are repeated for a kth pattern material and a kth resist layer in order from k=1 to k=(n−1) (k: an integer of 1 to (n−1)): (1) forming a guide hole penetrating the kth resist layer by exposure and development, (2) filling a kth pattern material into the above-mentioned guide hole by a screen printing process, (3) removing the kth resist layer, and (4) forming a (k+1)th resist layer by applying a resist composition to the support and the first to the kth pattern materials, thus forming a guide hole penetrating the nth resist layer by exposure and development, filling the nth pattern material into the guide hole by a screen printing process, and removing the nth resist layer. According to the second pattern formation method, similar to the first pattern formation method, a plurality of patterns of identical or different pattern materials can be formed on the support for a short time.

Hereinafter, with reference to the drawings, the second pattern formation method will be described in detail. FIGS. 6A to 6I are longitudinal sectional views showing a second pattern formation method. With reference to FIGS. 6A to 6I, a pattern formation method in accordance with an embodiment of the present invention is described. It should be noted that in FIGS. 6A to 6I, a case of n=2 is described.

Initially, in the step shown in FIG. 6B, the first resist layer 12 is formed by applying a resist composition to the surface of the support 11 shown in FIG. 6A.

Well-known methods can be used to form the first resist layer 12 by applying the resist composition to the surface of the support 11, without particular limitation thereto. In the first resist layer 12, the guide hole 13a is formed in order to form the pattern material layer 14a, as described later. The guide hole 13a becomes a casting mold when forming the pattern material layer 14a and thus is required to have a sufficient depth for forming the pattern material layer 14a. The thickness of the first resist layer 12 becomes the future depth of the guide hole 13a and thus is appropriately determined in consideration of the necessary depth of the guide hole 13a. The thickness of the first resist layer 12 is, for example, 10 to 100 µm, but is not particularly limited thereto.

The resist composition used for forming the first resist layer 12 may be a well-known composition without particular limitation thereto, and may be positive-type or negative-type. Furthermore, the positive-type resist composition may be a non-chemical amplification type or chemical amplification type. Examples of the non-chemical amplification type positive-type resist composition include those containing at least a quinone diazide group-containing compound and an alkali-soluble resin. On the other hand, examples of the chemical amplification-type positive-type resist composition may include those containing at least a photoacid generator and a resin which has an acid-dissociating elimination group and increases alkali solubility when the elimination group is eliminated by action of an acid generated from the photoacid generator through exposure. Furthermore, examples of the negative-type resist composition may include a polymerizable negative-type resist composition containing a least an alkali-soluble resin, a photopolymerizable monomer, and a photopolymerization initiator; a chemical amplification-type negative-type resist composition containing at least an alkali-soluble resin, a cross-linking agent, and an acid generator; and a chemical amplification-type negative-type resist composition for solvent-development processes containing at least a photoacid generator and a resin which has an acid-dissociating elimination group and increases polarity when the elimination group is eliminated by action of an acid generated from the photoacid generator through exposure. Among them, the chemical amplification-type resist composition is preferable and the positive-type resist composition is more preferable because the first resist layer 12 tends to be removed more easily in the step shown in FIG. 6E (described later).

Next, the step shown in FIG. 6C is described.

In this step, initially, the first resist layer 12 is selectively exposed through a desired mask. Consequently, when the first resist layer 12 is formed using a positive-type resist composition, the part to be the future guide hole 13a becomes soluble to a developer, and the part not to be the future guide hole 13a retains its insolubility to the developer. On the other hand, when the first resist layer 12 is formed using a negative-type resist composition, the part not to be the future guide hole 13a becomes insoluble to a developer, and the part to be the future guide hole 13a retains its solubility to the developer. As necessary, heating (PEB) is carried out after the selective exposure.

The selectively exposed first resist layer 12 is developed. The development can be carried out by well-known processes using well-known developers. The developer may be, for example, an alkaline aqueous solution, and, in cases of solvent development processes, ester solvents such as butyl acetate and ketone solvents such as methyl amyl ketone. Additionally, the developing process may be, for example, immersion processes, spray processes, puddle processes, dynamic dispense processes, and the like.

The guide hole 13a penetrating up to the surface of the support 11 is formed in the developed first resist layer 12. The guide hole 13a is used as a casting mold in order to deposit a pattern material in the step shown in FIG. 6D (described later). As necessary, after-curing by irradiation with an active energy beam such as UV rays or post-baking as additional heat treatment is applied to the first resist layer 12 where the guide hole 13a has been formed. Solvent resistance and plating solution resistance of the first resist layer 12 necessary at the step of filling the pattern material, as described later, are further improved by applying the after-curing or post-baking.

Next, the step shown in FIG. 6D is described.

In this step, a first pattern material is filled into the guide hole 13a formed in the step shown in FIG. 6C by a screen printing process. That is, the first pattern material layer 14a is formed on the surface of the support 11 using the guide hole 13a as a casting mold.

The screen printing process can be carried out using, for example, a commercially available screen printer while appropriately adjusting squeegee pressure; squeegee speed; and material, hardness, grinding angle, or the like of the squeegee used.

Next, the step shown in FIG. 6E is described.

n this step, the first resist layer 12 is removed. Specifically, for example, a method for stripping the first resist layer 12 using a stripping liquid is employed. In this case, the stripping process is not particularly limited, and immersion processes, spray processes, shower processes, puddle processes, or the like may be used as the stripping process. Additionally, the stripping liquid may be appropriately selected depending on the components of the resist composition used in the resist layer and may be, for example, 3 to 15 mass % aqueous solution of sodium hydroxide, aqueous solution of potassium hydroxide, organic amines, aqueous solution of tetramethyl ammonium hydroxide, triethanolamine, N-methylpyrrolidone, dimethyl sulfoxide, acetone, and other resist solvents such as propylene glycol monomethyl ether acetate. The stripping treatment time may be, for example, about 1 to 120 minutes, but is not particularly limited thereto. It should be noted that the stripping liquid may be warmed to about 25 to 60° C.

In this step, one pattern made of the first pattern material is formed on the support.

Next, the step shown in FIG. 6F is described.

In this step, the resist composition is applied to the support 11 and the first pattern material layer 14a to thereby form the second resist layer 15. In the second resist layer 15, the guide hole 13b is formed for forming the pattern material layer 14b, as described later. The guide hole 13b becomes a casting mold when forming the pattern material layer 14b and thus is required to have a sufficient depth for forming the pattern material layer 14b. Furthermore, the second resist layer 15 is formed on the first pattern material layer 14a and thus also functions as a protective layer of the first pattern material layer 14a. That is, if the guide hole 13b is formed without forming the second resist layer 15 on the first pattern material layer 14a, as described later, the first pattern material layer 14a is brought into contact with the developer and flows out in the process. As described above, formation of the second resist layer 15 on the first pattern material layer 14a can prevent the first pattern material layer 14a from being brought into contact with the developer and flowing out.

The type and coating process of the resist composition are similar to those described above as to the step shown in FIG. 6B. The resist composition used in the step shown in FIG. 6F may be the same as the resist composition used in the step shown in FIG. 6B or different therefrom in terms of compositional component or type.

The thickness of the second resist layer 15 is not particularly limited as long as its function as the protective layer for the first pattern material layer 14a is assured, and it is appropriately determined in consideration of the depth required for the guide hole 13b formed in the step shown in FIG. 6G mentioned later and it may be, for example, 1 to 20 µm.

Next, the step shown in FIG. 6G is described.

In this step, initially, the second resist layer 15 is selectively exposed through a desired mask. Consequently, when the second resist layer 15 is formed using a positive-type resist composition, the part to be the future guide hole 13b becomes soluble to a developer and the part not to be the future guide hole 13b retains its insolubility to the developer. On the other hand, when the second resist layer 15 is formed using a negative-type resist composition, the part not to be the future guide hole 13b becomes insoluble to a developer, and the part to be the future guide hole 13b retains its solubility to the developer. As necessary, heating (PEB) is carried out after the selective exposure.

The selectively exposed second resist layer 15 is developed. The developer and the development process are the same as those described for the step shown in FIG. 6C.

The guide hole 13b penetrating up to the surface of the support 11 is formed in the developed second resist layer 15. The guide hole 13b is used as a casting mold in order to deposit a pattern material in the step shown in FIG. 6H (described later). As necessary, after-curing by irradiation with an active energy beam such as UV rays or post-baking as additional heat treatment is applied to the second resist layer 15 where the guide hole 13b has been formed. Solvent resistance and plating solution resistance of the second resist layer 15 necessary at the step of filling the pattern material, as described later, are further improved by applying the after-curing or post-baking.

Next, the step shown in FIG. 6H is described.

In this step, a second pattern material is filled into the guide hole 13b formed in the step shown in FIG. 6G by a screen printing process. That is, the second pattern material layer 14b is formed on the surface of the support 11 using the guide hole 13b as a casting mold.

The conditions of the screen printing process are similar to those described in terms of the step shown in FIG. 6D.

Next, the step shown in FIG. 6I is described.

In this step, the second resist layer 15 is removed. Specifically, for example, a method for stripping the second resist layer 15 using a stripping liquid is employed. The stripping process, stripping liquid, and stripping treatment time are similar to those described in terms of the step shown in FIG. 6E.

As described above, two patterns of the first and second pattern materials can be formed on the support.

Figure 6:
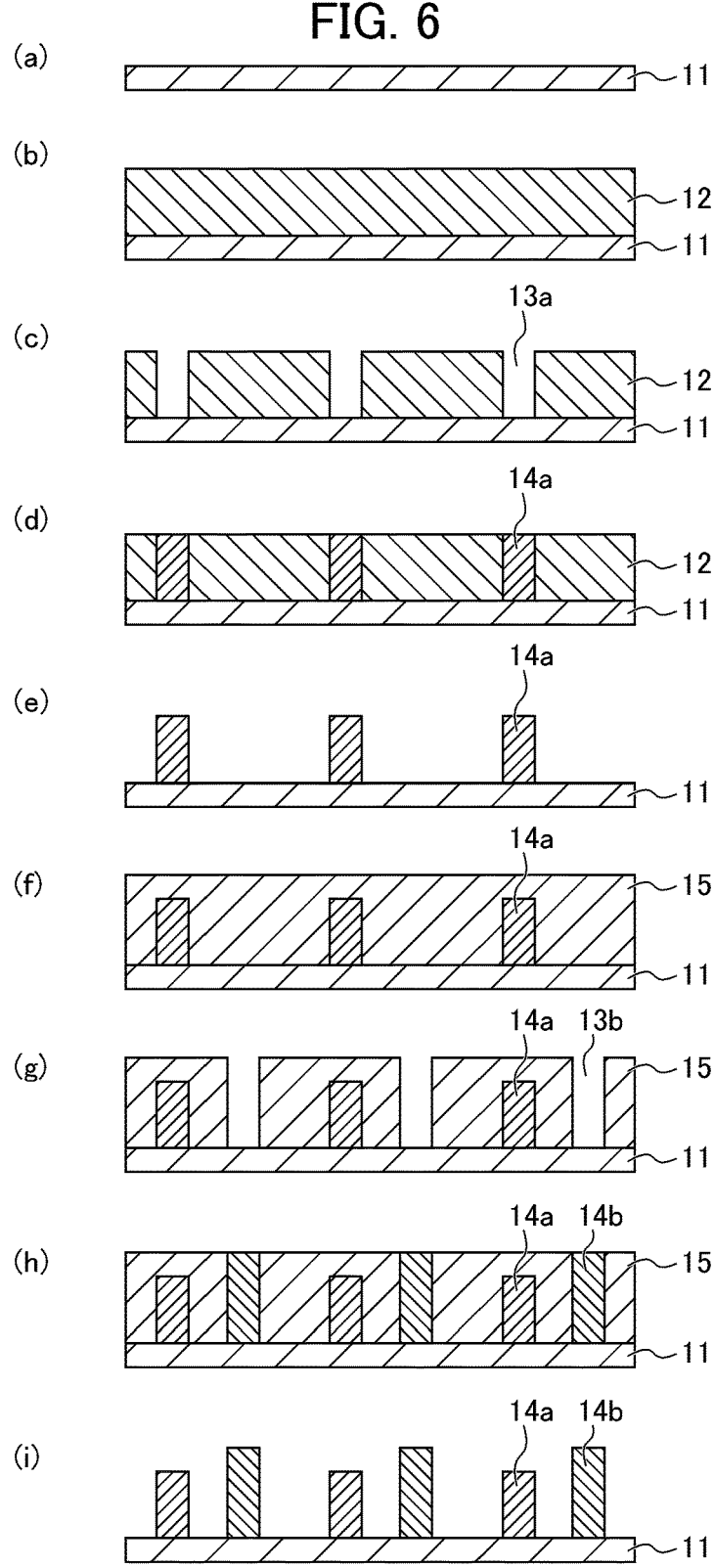
FIGS. 6A to 6I are longitudinal sectional views illustrating a second pattern formation method used in a method for manufacturing a comb-shaped electrode used in a lithium ion secondary battery in accordance with an embodiment of the present invention.

It should be noted that in FIG. 6, the case of n=2 is described, but in the case of n=3 or more, steps shown in FIGS. 6C to 6F are repeated a necessary amount of times, and n patterns composed of identical or different pattern materials can be formed on the support.

The positive electrode and the negative electrode can be formed on the current collectors 12a and 12b by carrying out patterning according to FIG. 6, for example, using the current collectors 12a and 12b in FIG. 2 as the support 11 in FIG. 6, using the positive-electrode active material layer 13a in FIG. 2 as the first pattern material layer 14a in FIG. 6, and using the negative-electrode active material layer 13b in FIG. 2 as the second pattern material layer 14b in FIG. 6.

[Cover Member Bonding Step]

Cover member bonding steps are sequentially shown in FIGS. 3B and 3C.

In this step, the cover member 9 is bound to the surface of the substrate 4. As a result, an airtight chamber containing the comb-shaped electrodes 1a and 1b is defined by the substrate 4 and the cover member 9. Examples of the method for bonding the cover member 9 to the surface of the substrate 4 include methods used in the field of semiconductors, for example, a method using an adhesive agent such as an epoxy adhesive agent, soldering, anode junction, and the like.

[Electrolyte Filling Step]

An electrolyte filling step is a step shown in FIG. 3C.

In this step, the electrolyte 8 involved in a battery reaction between the comb-shaped electrodes 1a and 1b is filled into the airtight chamber defined in the cover member bonding step. Filling of the electrolyte 8 is carried out through two liquid injection holes 10 formed in the lateral surface of the cover member 9. A filling method is not particularly limited, and may include an infusion under reduced pressure, infusion using a syringe, and the like, but infusion under reduced pressure is preferable from the viewpoint that the degree of charging efficiency is high and filling inconsistency does not easily occur. The infusion under reduced pressure can be carried out by immersing a structure composed of the substrate 4 and the cover member 9 into the electrolyte 8 and reducing pressure.

It should be noted that in order to prevent leakage of the electrolyte 8, moisture absorption of the electrolyte 8, or the like, after filling of the electrolyte 8, the liquid injection hole 10 is sealed with the adhesive agent 50 such as an epoxy adhesive agent.

A nonaqueous secondary battery 100A in accordance with another embodiment of the present invention is described. The nonaqueous secondary battery 100A is the same as the nonaqueous secondary battery 100 except that nonaqueous secondary battery 100A includes a cover member 9A, which does not have the liquid injection hole 10, instead of the cover member 9, and includes an electrolyte 8A as a gel electrolyte or a solid electrolyte instead of the electrolyte 8.

Hereinafter, a method for manufacturing the nonaqueous secondary battery 100A in accordance with another embodiment of the present invention is described. The method for manufacturing the nonaqueous secondary battery 100 in accordance with this embodiment of the present invention includes at least an electrode formation step, an electrolyte disposing step, and a cover member fixing step. Hereinafter, each step is described with reference to FIG. 7.

[Electrode Formation Step]

An electrode formation step includes steps which are sequentially shown in FIGS. 7A and 7B, and are similar to those described in terms of the steps sequentially shown in FIGS. FIGS. 3A and 3B, and therefore the description therefor is omitted herein.

[Electrolyte Disposing Step]

An electrolyte disposing step is a step shown in FIG. 7C.

In this step, the electrolyte 8A involved in a battery reaction between the comb-shaped electrode 1a and the comb-shaped electrode 1b is disposed at least between the facing end surfaces of the comb-shaped electrode 1a and the comb-shaped electrode 1b. The electrolyte 8A is a gel electrolyte or a solid electrolyte. A method for disposing the electrolyte 8A is not particularly limited, and examples of the method include a method of applying a gel electrolyte to at least the comb-shaped electrode 1a, the comb-shaped electrode 1b, and the substrate 4, a method of applying a solid electrolyte precursor to at least the comb-shaped electrode 1a, the comb-shaped electrode 1b, and the substrate 4, thereby, for example, cross-linking between polymers contained in the above-mentioned solid electrolyte precursor to form the above-mentioned solid electrolyte precursor into a solid electrolyte, and the like. As necessary, a step of forming a mask, in advance, in a part on which the electrolyte 8A is not formed, may be added. When a mask is formed, it is preferable that the mask is stripped before the cover member fixing step mentioned below is performed. Furthermore, it is preferable that a precursor of a gel electrolyte or a solid electrolyte used to form the electrolyte 8A is finally hardened by heat or light.

[Cover Member Fixing Step]

A cover member fixing step is a step shown in FIG. 7D.

In this step, the cover member 9A is fixed on the substrate 4. As a result, the airtight chamber containing the comb-shaped electrodes 1a and 1b is defined by the substrate 4 and the cover member 9A, and is filled with the electrolyte 8A. A method for fixing the cover member 9A on the substrate 4 is not particularly limited, and examples of the method include a method of attaching a coating film (for example, a PET film or a glass film) made of material exemplified in terms of the cover member 9 to the electrolyte 8A disposed in the electrolyte disposing step, directly or through an adhesive agent such as an epoxy adhesive agent, a method of coating the electrolyte 8A disposed in the electrolyte disposing step or the above-mentioned coating film attached to the electrolyte 8A with gas barrier material, and the like. Examples of the method of coating with gas barrier material include a method of forming a coating membrane made of gas barrier material by film-forming organic or inorganic gas barrier material on the electrolyte 8A disposed in the electrolyte disposing step or on the above-mentioned coating film attached to the electrolyte 8A by an application process, a vacuum film-formation process, or the like. The electrolyte 8A or the coating membrane made of the gas barrier material formed on the above-mentioned coating film attached to the electrolyte 8A may be ones formed of a plurality of different gas barrier materials by, for example, a method of forming a coating membrane made of inorganic gas barrier material by film-forming inorganic gas barrier material on a coating membrane made of organic gas barrier material, a method of forming a coating membrane made of organic or inorganic gas barrier material by film-forming organic or inorganic gas barrier material on the above-mentioned coating film attached to the electrolyte 8A, and a method of forming a coating membrane made of organic gas barrier material by film-forming organic gas barrier material on a coating membrane made of inorganic gas barrier material, and the like. In the case of forming a coating membrane made of inorganic gas barrier material, for example, a film of metal such as aluminum may be formed on the electrolyte 8A or the above-mentioned coating film attached to the electrolyte 8A or a coating membrane made of organic gas barrier material by a coating process or a vacuum film formation process, or the like, or a below-mentioned coating membrane made of inorganic compound coating material may be formed by a coating process or a vacuum film formation process, or the like.

Examples of the organic gas barrier material include cycloolefin resin, polyethylene resin, polytetrafluoroethylene resin, polymethyl methacrylate (PMMA), and the like. As the organic gas barrier material, rubber materials such as styrene resin and butadiene resin may be used, but in this case, it is preferable to use an inorganic gas barrier material and/or sealing material together with the organic gas barrier material. Examples of the inorganic gas barrier material include inorganic compound coating materials such as amorphous silicon, silicon nitride, silicon oxide, silicon oxynitride, ITO, aluminum nitride, and aluminum oxide; metal such as aluminum; and the like. Furthermore, examples of the application process of gas barrier material include spin coating, spray coating, and the like. When the gas barrier material includes the inorganic gas barrier material, a vacuum film formation method such as a sputtering process, a vapor deposition method, or a CVD method may be used. Furthermore, the coating membrane made of gas barrier material may be sealed with sealing material. Examples of the sealing material include epoxy resin such as cresol novolac epoxy resin, phenol novolac epoxy resin, biphenyl diepoxy resin, and naphthol novolac epoxy resin. The sealing material may include an additive such as a filler.

Since the method for manufacturing the nonaqueous secondary battery 100A in accordance with the other embodiment of the present invention does not require an injection operation for an electrolyte solution, a plurality of nonaqueous secondary batteries (unit cells) can be formed on the substrate at the same time. In the electrode formation step, a plurality of pairs of the positive electrode and the negative electrode having a combination of patterns of various circuits (series circuits or parallel circuits) or a combination of various sizes are formed on the substrate according to the desired unit cell, and the substrate is subjected to the electrolyte disposing step and the cover member fixing step, and thereby, the substrate provided with a plurality of nonaqueous secondary batteries (unit cells) can be obtained. The substrate can be then subjected to a dividing process according to the desired unit cells, and thereby a plurality of unit cells having various electrode patterns or sizes can be manufactured with high efficiency at the same time.

It should be noted that the dividing process may be carried out at any of the stages before the electrolyte disposing step or the cover member fixing step.

Furthermore, also in the embodiment in which infusing of an electrolyte solution is carried out, in the electrode formation step, depending upon the desired unit cells, a plurality of pairs of the positive electrode and the negative electrode having a combination of patterns of various circuits (series circuits or parallel circuits) or a combination of various sizes may be formed on the substrate. In this case, the dividing process can be carried out at any of the stages after the electrode formation step and before the electrolyte filling step.

EXAMPLES

Hereinafter, the present invention is described more specifically with reference to examples; however, the present invention is not limited to the examples at all.

Synthesis Example 1

Propylene glycol monomethyl ether acetate (PGMEA) as a solvent was added to 70 parts by mass of a cresol-type novolac resin (mass average molecular weight: 30000) resulting from an ordinary method of addition condensation between a mixture of m-cresol and p-cresol (m-cresol/p-cresol=6/4 (mass ratio)) and formaldehyde in the presence of an acid catalyst, 15 parts by mass of naphthoquinone-1,2-diazide-5-sulfonic acid diester of 1,4-bis(4-hydroxyphenyl isopropylidenyl)benzene as a photosensitizing agent, and 15 parts by mass of poly(methyl vinyl ether) (mass average molecular weight: 100000) as a plasticizer such that the solid content concentration is 40 mass % followed by mixing and dissolving, thereby obtaining a resist composition 1. The resist composition 1 is novolac type, non-chemical amplification type, and positive type.

Synthesis Example 2

52.5 parts by mass of a cresol-type novolac resin (mass average molecular weight: 10000) resulting from an ordinary method of addition condensation between a mixture of m-cresol and p-cresol (m-cresol/p-cresol=6/4 (mass ratio)) and formaldehyde in the presence of an acid catalyst, 10 parts by mass of a polyhydroxystyrene resin VPS-2515 (manufactured by Nippon Soda Co.), 27.5 parts by mass of a resin expressed by Formula (1) below, 10 parts by mass of a resin expressed by Formula (2) below, 2 parts by mass of a compound expressed by Formula (3) below as an acid generator, 2 parts by mass of 1,5-dihydroxynaphthalene as a sensitizer, 0.01 parts by mass of triethylamine and 0.02 parts by mass of salicylic acid as additives, and 107 parts by mass of PGMEA and 6 parts by mass of gamma-butyrolactone as solvents were mixed and dissolved, thereby obtaining a resist composition 2. The resist composition 2 is chemical amplification type and positive type.

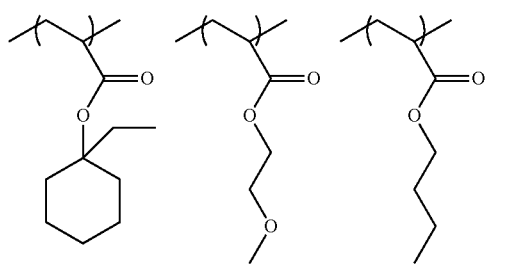

(1)

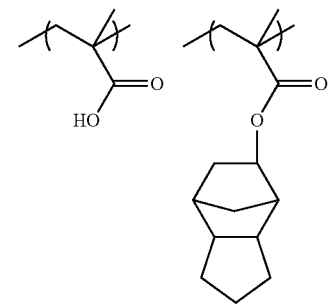

(2)

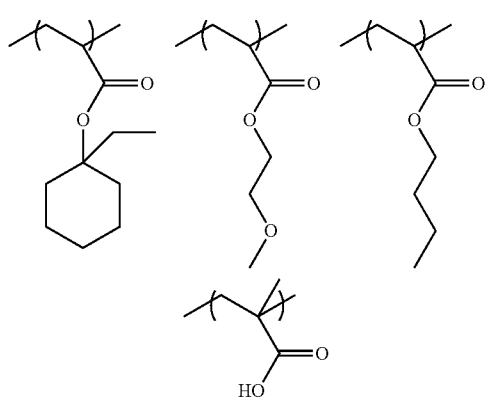

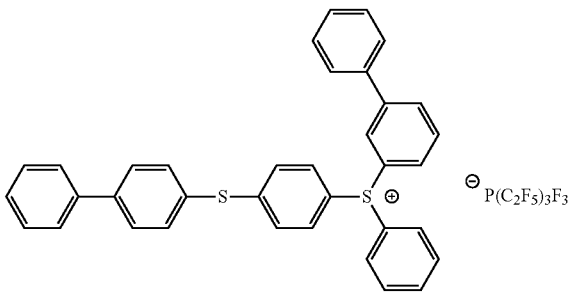

(3)

Example 1

The comb-shaped electrodes 1a and 1b shown in FIG. 2 were produced using a screen printing process (the second pattern formation method described above). The entire size of comb-shaped electrodes, thickness of teeth, space between two adjacent teeth, length of teeth, number of teeth, and thickness of the active material layer were set as shown in Table 1.

TABLE 1

| | Entire size of comb-shaped electrode (mm × mm) | Thickness of teeth (μm) | Space between teeth (μm) | Length of teeth (mm) | Number of teeth (teeth) | Thickness of the active material layer (μm) |
|---|---|---|---|---|---|---|
| Example 1 | 25 × 13 | 40 | 30 | 12.92 | 187 | 40 |

(Formation of Current Collector)

Initially, an aluminum film (thickness: 400 nm) as a conductive layer was formed by a sputtering process on the surface of a silicon substrate having an oxide film on the upper layer of which a titanium thin film had been formed as an adhesion imparting layer (i.e. the surface of a titanium thin film). The positive-type resist composition 1 of Synthesis Example 1 was applied to the substrate by a spin coating process to thereby form a resist layer of 1.5 μm, followed by drying at 120° C. for 1 minute. Then, the resist layer was selectively exposed (ghi mixed rays, exposure amount: 100 mJ/cm$^2$) using a mask with a pattern corresponding to the comb-shaped electrodes 1a and 1b shown in FIG. 2. Next, development was carried out with an alkaline developer of 2.38 mass % TMAH for 1 minute. After the development, the aluminum film and the titanium thin film were etched by a dipping process using an aluminum etching liquid ($H_3PO_4$:$HNO_3$:$H_2O$=4:1:1.6 (mass ratio)) to thereby form an aluminum pattern (pattern having a pattern of titanium thin film at the lower layer), thereby forming comb-shaped current collectors 12a and 12b.

(Forming of Guide Hole (1))

The resist composition of Synthesis Example 1 was coated by a spin coating process on a surface of a silicon wafer on which the current collector had been formed, to thereby form a resist layer of 50 μm, followed by drying at 140° C. for 5 minutes. Then, using a positive mask having the same shape in a plan view as that of the above-formed comb-shaped current collector 12a, the resist layer at the position above the comb-shaped current collectors was exposed (ghi mixed rays, exposure amount: 60 mJ/cm$^2$). Next, baking was carried out at 85° C. for 3 minutes as an activation step, followed by development with an alkaline developer. Consequently, a comb-shaped guide hole having the same shape in a plan view as that of the current collector 12a was formed on the surface of the silicon wafer. The current collector 12a was exposed at the base of the guide hole.

(Formation of Active Material Layer (1))

34.02 g of LiFePO$_4$ particles, 5.04 g of acetylene black as a conductive aid, 2.10 g of carboxymethylcellulose as a dispersant, and 0.84 g of styrene-butadiene rubber (SBR) as a binder (mass ratio of 81:12:5:2) were mixed and 58 g of water was further added and mixed, thereby obtaining a dispersion liquid with a solid content of 42 mass %. The dispersion liquid was further mixed and dispersed by rotating at 2000 rpm for 10 minutes in a rotation-revolution type mixer (product name: Awatori Neritaro, manufactured by Thinky Co.) and the resulting mixture was used as a positive-electrode active material.

Screen printing was carried out on the silicon wafer where the guide hole had been formed and the positive-electrode active material was filled into the guide hole followed by drying at 100° C. for 5 minutes, thereby forming a positive-electrode active material layer. The screen printing was carried out at a squeegee pressure of 180 MPa and a squeegee speed of 15.0 mm/sec using a screen printer (model MT-320T, manufactured by Micro-tec Co.) equipped with a silicon squeegee polished to an angle of 45° and having a hardness of 60°.

(Stripping of Resist Layer (1))

The resist layer was stripped off with acetone.

(Forming of Guide Hole (2))

The resist composition 2 of Synthesis Example 2 was coated by a spin coating process on a surface of a silicon wafer on which the positive-electrode active material had been deposited to thereby form a resist layer of 60 μm, followed by drying at 140° C. for 1 minute.

Using a positive mask having the same shape in a plan view as that of the above-formed comb-shaped current collector 12b, the resist layer at the position above the comb-shaped current collectors was exposed (ghi mixed rays, exposure amount: 60 mJ/cm$^2$). Next, baking was carried out at 85° C. for 3 minutes as an activation step, followed by development with an alkaline developer. Consequently, while protecting the positive-electrode active material with the resist layer functioning also as a protective layer, a comb-shaped guide hole having the same shape in a plan view as that of the current collector 12b was formed on the surface of the silicon wafer. The current collector 12b was exposed at the base of the guide hole.

(Formation of Active Material Layer (2))

34.02 g of Li$_4$Ti$_5$O$_{12}$ particles, 5.04 g of acetylene black as a conductive aid, 2.10 g of carboxymethylcellulose as a dispersant, and 0.84 g of SBR as a binder (mass ratio of 87:6:5:2) were mixed and 58 g of water was further added and mixed, thereby obtaining a dispersion liquid with a solid content of 42 mass %. The dispersion liquid was further mixed and dispersed by rotating at 2000 rpm for 10 minutes in a rotation-revolution type mixer (product name: Awatori Neritaro, manufactured by Thinky Co.) and the resulting mixture was used as a negative-electrode active material.

Screen printing was carried out on the silicon wafer where the guide hole had been formed and the negative-electrode active material was filled into the guide hole followed by drying at 100° C. for 5 minutes, thereby forming a negative-electrode active material layer. The screen printing was carried out at a squeegee pressure of 180 MPa and a squeegee speed of 15.0 mm/sec using a screen printer (model MT-320T, manufactured by Micro-tec Co.) equipped with a silicon squeegee polished to an angle of 45° and having a hardness of 60°.

(Stripping of Resist Layer (2))

Finally, the resist layer was stripped off with acetone, thereby obtaining comb-shaped electrodes 1a and 1b. The time required for filling the electrode active materials by the screen printing process was as very short as 15 minutes.

Charge-Discharge Property

Example 2

The cover member 9 was produced as follows. Non-alkali glass (NA32R manufactured by NH Techno Glass Corporation, film thickness: 750 μm, diameter: 6 inch) was prepared. A plurality of cover members 9 were produced at the same time on the non-alkali glass, and finally divided into individual pieces by dicing processing. Hereinafter, the method for producing the cover member 9 is described with reference to FIG. 8, but in the description, only one sample of a plurality of samples produced at the same time is shown. In FIGS. 8A to 8C, blasting resist (BF410 manufactured by TOKYO OHKA KOGYO CO., LTD.) was laminated on one side of the main surfaces of the above-mentioned non-alkali glass, and exposure and development were carried out to expose a blast-processed surface as shown in FIG. 8C. In FIG. 8D, sandblast processing was carried out and the above-mentioned blast-processed surface was dug 100 μm down. In FIG. 8E, the resist was stripped off with acetone. Thereafter, the sample was divided into individual pieces by dicing processing, liquid injection holes 10 were formed by polishing on the lateral surface so as to obtain the cover member 9. The dimensions of the cover member 9 were 22 mm×33 mm×750 mμm; the dimensions of the concave part dug by the sandblast processing were 18 mm×29 mm×100 μm. Furthermore, the dimensions of the opening of the liquid injection hole 10 were 500μ×500 μm on the lateral surface of the cover member 9.

In order that the comb-shaped electrodes 1a and 1b obtained in Example 1 may be housed in a concave part formed on the cover member 9, the cover member 9 and a silicon wafer on which the comb-shaped electrodes 1a and 1b had been formed were bonded to each other with an epoxy adhesive agent. Thereafter, a structure composed of the cover member 9 and the silicon wafer was immersed in an electrolyte solution (1 M LiClO$_4$ solution (solvent: mixture solution containing ethylene carbonate and diethyl carbonate in the volume ratio of 1:1), and decompressed at 2 Pa for three minutes, and thereby an electrolyte solution was infused into the airtight chamber defined by the cover member 9 and the silicon wafer, through the liquid injection hole 10. After infusion was completed, the liquid injection hole 10 was sealed with epoxy resin to obtain lithium ion secondary batteries (number of samples: 3).

The thickness of the thus obtained lithium ion secondary battery was 1.5 mm, and was much thinner than a conventional lithium ion secondary battery.

Figure 9:
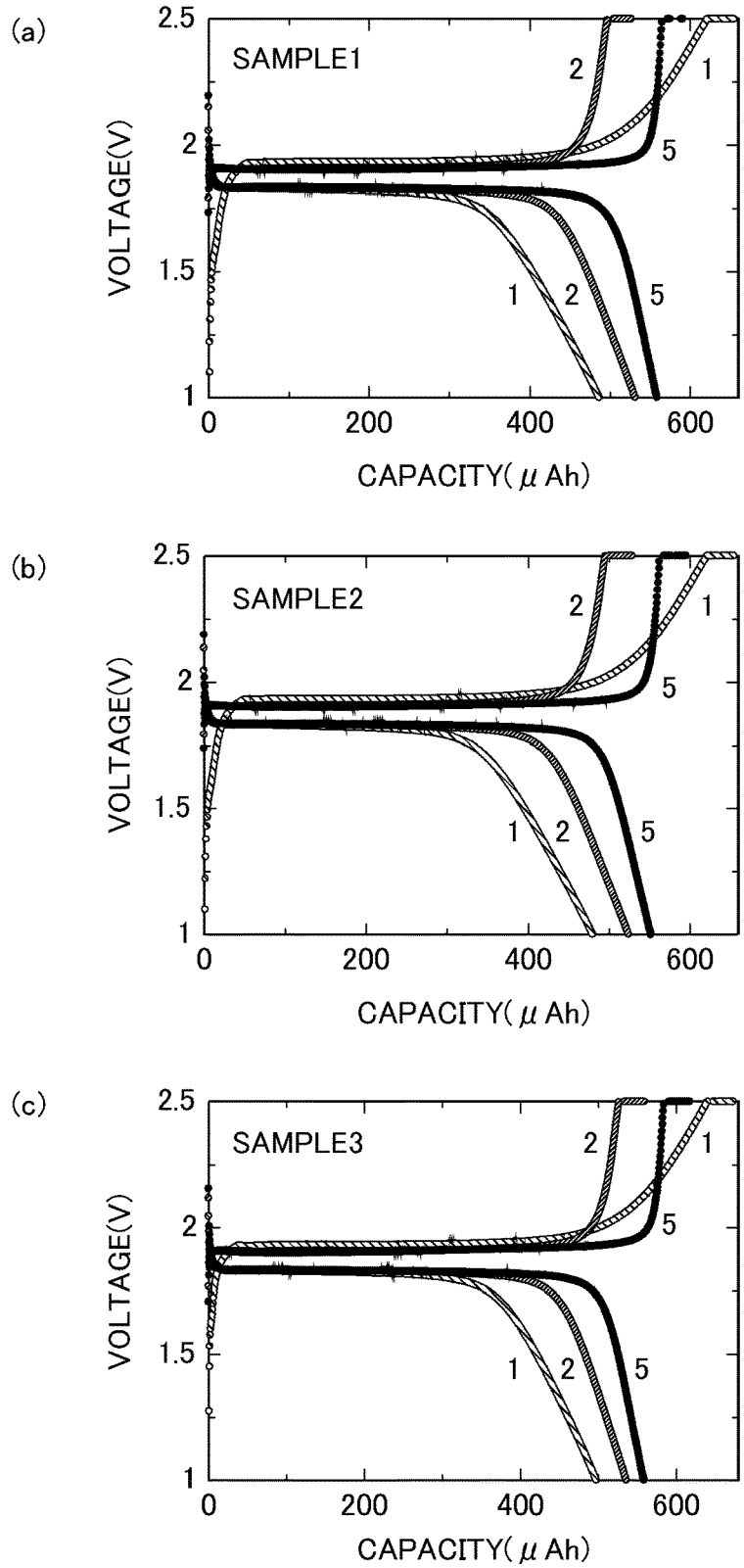
FIGS. 9A to 9C are graphs illustrating measurement of charge-discharge curves using a lithium ion secondary battery while changing the number of cycles in accordance with an embodiment of the present invention, in which numerals in the drawing represent the number of cycles.

These secondary batteries were charged and discharged with the electric current value set at 400 μA. The charge-discharge curves are shown in FIGS. 9A to 9C. All of the three samples had the same level of capacity, and showed reproductivity. Furthermore, values of the initial discharge capacities (at the fifth cycle) read from the charge-discharge curves are shown in Table 2.

TABLE 2

| | Sample | | |
|---|---|---|---|
| | 1 | 2 | 3 |
| Initial discharge capacity (at fifth cycle) (μAh) | 559 | 552 | 559 |

It is understood from these results that the above-mentioned lithium ion secondary battery as the nonaqueous secondary battery in accordance with the present invention has excellent charge-discharge properties.

Rate Property

Example 3

Figure 10:
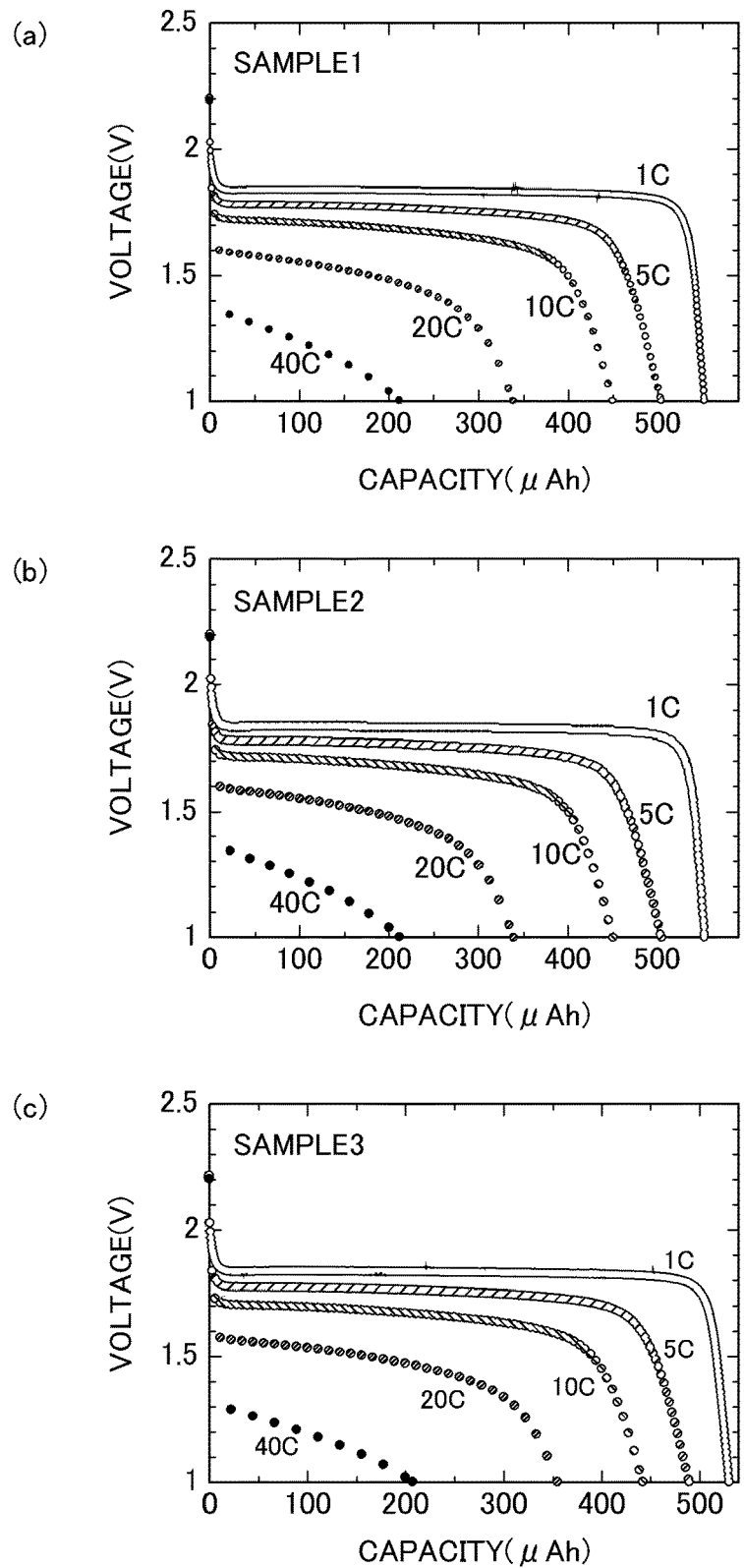
FIGS. 10A to 10C are graphs illustrating measurement of discharge curves using a lithium ion secondary battery while changing a C-rate in accordance with an embodiment of the present invention.
Figure 11:
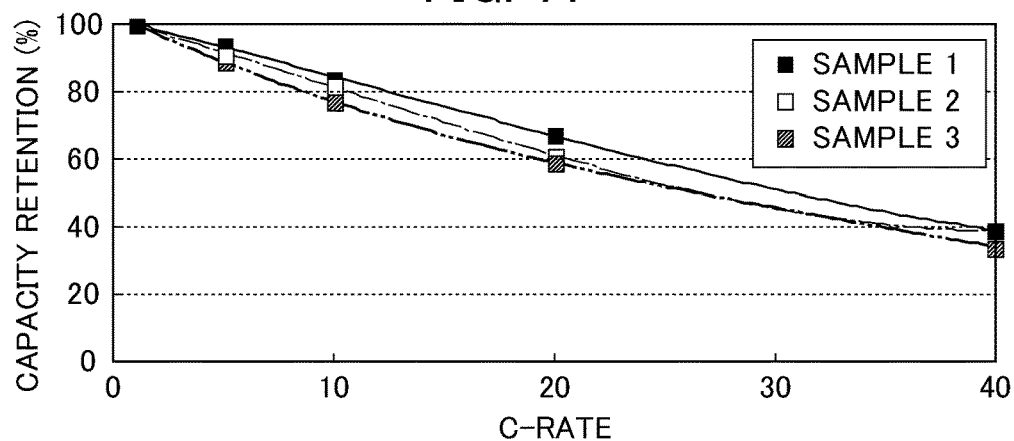
FIG. 11 is a graph illustrating a relation between C-rate and capacity retention in a lithium ion secondary battery in accordance with an embodiment of the present invention.

The lithium ion secondary batteries (samples 1 to 3) produced in Example 2 were charged and discharged as in Example 2 with the C-rate set to 1C, 5C, 10C, 20C, or 40C. The discharge curves are shown in FIGS. 10A to 10C. Furthermore, the discharge capacity retention at each C-rate, when the discharge capacity at 1C is defined as 100%, is shown in Table 3 and FIG. 11.

TABLE 3

| | | C-rate | | | | |
|---|---|---|---|---|---|---|
| | | 1 C | 5 C | 10 C | 20 C | 40 C |
| Discharge capacity retention (%) | Sample 1 | 100 | 94 | 84 | 67 | 39 |
| | Sample 2 | 100 | 91 | 82 | 61 | 39 |
| | Sample 3 | 100 | 89 | 77 | 59 | 34 |

It is understood from the above-mentioned results that the above-mentioned lithium ion secondary battery as the non-aqueous secondary battery in accordance with the present invention has excellent discharge capacity retention even when the C-rate is increased.

Cycle Property

Example 4

Figure 12:
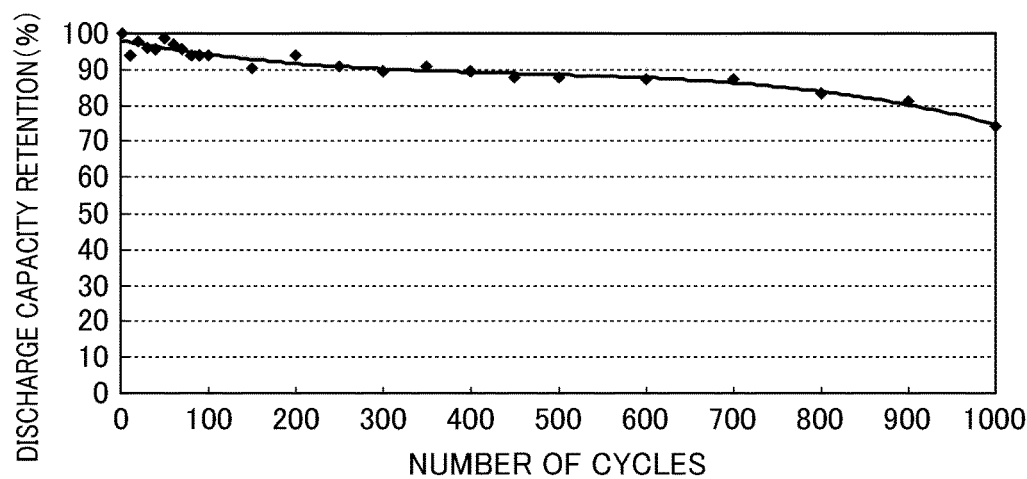
FIG. 12 is a graph illustrating a relation between the number of cycles and discharge capacity retention in a lithium ion secondary battery in accordance with an embodiment of the present invention.

The lithium ion secondary batteries produced as in Example 2 were charged and discharged similar to Example 2 (C-rate: 5C). Charge and discharge were repeated for 1000 cycles, and the discharge capacity was measured at predetermined cycles. The capacity retention at each cycle, when the discharge capacity at the first cycle is defined as 100%, is shown in FIG. 12. Even at the 1000th cycle, the capacity retention was 75%.

It is understood from these results that the above-mentioned lithium ion secondary battery as the nonaqueous secondary battery in accordance with the present invention has stable capacity retention even after the 1000th cycle.

Impartation of Hydrofluoric Acid-Resistance

Example 5

A lithium ion secondary battery was obtained similar to Example 2 except that the cover member 9 having a surface on which platinum had been vapor-deposited by a sputtering process was used, and 1M $LiPF_6$ solution (solvent: mixture liquid of ethylene carbonate and diethyl carbonate in a volume ratio 1:1) was used as the electrolyte solution. Herein, the thickness of the active material layer of the obtained lithium ion secondary battery was 20 μm, and the entire size of the comb-shaped electrodes, the thickness of teeth, the space between two adjacent teeth, the length of teeth, and the number of teeth are the same as those shown in Table 1.

Figure 13:
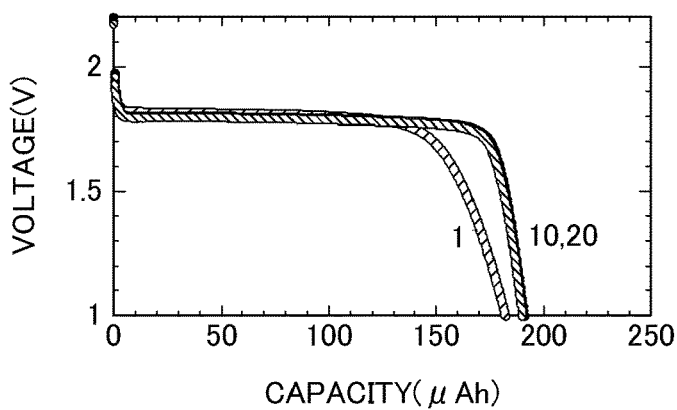
FIG. 13 is a graph illustrating measurement of discharge curves when a cover member having hydrofluoric acid-resistance is used and an electrolyte capable of liberating hydrofluoric acid is used in a lithium ion secondary battery in accordance with an embodiment of the present invention, in which numeric values in the drawing represent the number of cycles.

The lithium ion secondary battery was charged and discharged with an electric current value set at 200 μA. The discharge curve is shown in FIG. 13. It should be noted that since the thickness of the active material layer (electrode thickness) is half of that in Example 2, the electric current value was also made to be ½.

As is apparent from FIG. 13, when the cover member 9 having hydrofluoric acid-resistance was used, even when an electrolyte capable of liberating hydrofluoric acid was used, excellent discharge property was observed.

Example 6: Change of Supporting Substrate

The comb-shaped electrodes 1a and 1b shown in FIG. 2 were produced in a similar way to Example 1 except that the silicon substrate (silicon wafer) was changed to a glass substrate. It should be noted that the entire size of the comb-shaped electrodes, the thickness of teeth, the space between two adjacent teeth, the length of teeth, the number of teeth, and the thickness of the active material layer are the same as in Example 1, and are set to those shown in Table 1. Time required to fill electrode active material by a screen printing process was extremely short time, that is, 15 minutes.

Charge-Discharge Property

Example 7

A cover member 9 the same as that described in Example 2 was prepared, and in order that the comb-shaped electrodes 1a and 1b obtained in Example 6 may be housed in a concave part formed on the cover member 9, the cover member 9 and a glass substrate on which the comb-shaped electrodes 1a and 1b had been formed were bonded to each other with an epoxy adhesive agent. Thereafter, similar to Example 2, an electrolyte solution was infused into the airtight chamber defined by the cover member 9 and the above-mentioned glass substrate. After infusion was completed, the liquid injection hole 10 was sealed with epoxy resin to obtain lithium ion secondary batteries (number of samples: 3).

The thickness of the thus obtained lithium ion secondary battery was 1.5 mm, and was much thinner than a conventional lithium ion secondary battery.

When these secondary batteries were charged and discharged with the electric current value set at 400 μA, all of the three samples had the same level of capacity, and reproductivity was demonstrated. Furthermore, values of the initial discharge capacities (at the fifth cycle) read from the charge-discharge curves are shown in Table 4.

TABLE 4

| | Sample | | |
|---|---|---|---|
| | 1 | 2 | 3 |
| Initial discharge capacity (at fifth cycle) (μAh) | 555 | 553 | 560 |

Similar to Example 2, it is understood from these results that the above-mentioned lithium ion secondary battery as the nonaqueous secondary battery in accordance with the present invention has excellent charge-discharge properties.

Rate Property

Example 8

The lithium ion secondary batteries (samples 1 to 3) produced in Example 7 were charged and discharged as in Example 7 with the C-rate set to 1C, 5C, 10C, 20C, or 40C. The discharge capacity retention at each C-rate, when the discharge capacity at 1C is 100%, is shown in Table 5.

TABLE 5

| | | C-rate | | | | |
|---|---|---|---|---|---|---|
| | | 1 C | 5 C | 10 C | 20 C | 40 C |
| Discharge capacity retention (%) | Sample 1 | 100 | 94 | 85 | 68 | 38 |
| | Sample 2 | 100 | 89 | 83 | 64 | 39 |
| | Sample 3 | 100 | 90 | 80 | 63 | 35 |

Similar to Example 3, it is understood from the above-mentioned results that the above-mentioned lithium ion secondary battery as the nonaqueous secondary battery in accordance with the present invention has excellent discharge capacity retention even when the C-rate is increased.

Cycle Property

Example 9

The lithium ion secondary batteries produced as in Example 7 were charged and discharged similar to Example 7 (C-rate: 5C). Charge and discharge were repeated for 1000 cycles, and the discharge capacity was measured at predetermined cycles. Even at the 1000th cycle, the capacity retention was 75%.

Similar to Example 4, it is understood from these results that the above-mentioned lithium ion secondary battery as the nonaqueous secondary battery in accordance with the present invention has stable capacity retention even after the 1000th cycle.

Furthermore, in the lithium ion secondary batteries of Examples 7 to 9, since both the supporting substrate and the cover member are transparent, the entirety looks transparent. In the case of the lithium ion secondary batteries of Examples 7 to 9, in a region in which the teeth of the comb-shaped electrode 1a and the comb-shaped electrode 1b are alternately arranged seen in the direction perpendicular to the direction of the length of teeth in the comb-shaped electrode 1a and comb-shaped electrode 1b and parallel to the substrate 4, an area ratio of a transmission portion to the total of the teeth of the comb-shaped electrode 1a, the teeth of the comb-shaped electrode 1b, and a gap between the teeth of the comb-shaped electrode 1a and the teeth of the comb-shaped electrode 1b (transmission portion) was about 42% when seen from a direction perpendicular to the substrate 4.

In the lithium ion secondary batteries of Examples 7 to 9, when the thickness of teeth was changed to 20 µm, the space between two adjacent teeth was changed to 120 µm, the number of teeth was changed to 92, and the thickness of the active material layer was changed to 20 µm, the above-mentioned area ratio was about 86%. Furthermore, in the lithium ion secondary batteries of Examples 7 to 9, when the thickness of teeth was changed to 20 µm, the space between two adjacent teeth was changed to 200 µm, the number of teeth was changed to 59, and the thickness of the active material layer was changed to 20 µm, the above-mentioned area ratio was about 91%.

Transparent nonaqueous secondary batteries are also expected to contribute to improvement of design when they are used in combination with articles having, for example, an electrical generating element having a transparent member such as dye-sensitized solar cell or other transparent members.

Example 10: Change of Supporting Substrate

The comb-shaped electrodes 1a and 1b shown in FIG. 2 were produced in a similar way to Example 1 except that the silicon substrate (silicon wafer) was changed to a PET film. At this time, a production operation of the comb-shaped electrodes (that is, an operation from [Formation of Current Collector] to [Stripping of Resist Layer (2)] in Example 1) was carried out in a state in which four corners of the PET film were attached to the silicon wafer (hereinafter, a combination of the PET film and the silicon wafer in such a state may be referred to as a "PET film substrate"). However, in the procedure corresponding to (Forming of Guide Hole (1)) in Example 1, the drying condition was changed from drying at 140° C. for five minutes to drying at 120° C. for five minutes; in the procedure corresponding to (Forming of Guide Hole (2)) in Example 1, the drying condition was changed from drying at 140° C. for one minute to drying at 120° C. for one minute. It should be noted that the entire size of the comb-shaped electrodes, the thickness of teeth, the space between two adjacent teeth, the length of teeth, the number of teeth, and the thickness of the active material layer were the same as in Example 1, and were set as shown in Table 1. Time required to fill electrode active material by a screen printing process was an extremely short time, that is, 15 minutes.

Example 11

Next, a solid electrolyte precursor having the following composition was applied to the PET film substrate provided with comb-shaped electrodes 1a and 1b obtained in Example 10 by a casting process, followed by baking at 100° C. for one hour to obtain a solid electrolyte. Thus, a gap between the comb-shaped electrodes 1a and 1b was filled with the above-mentioned solid electrolyte. Thereafter, in order to coat the entire surface of the combination of the comb-shaped electrodes 1a and 1b and the solid electrolyte on the PET film substrate, the epoxy adhesive agent was applied by a casting process, and the PET film as the cover member 9 was attached thereto and dried at room temperature (23° C.) for one hour. After drying, the PET film was stripped off from the silicon wafer to obtain a lithium ion secondary battery.

The above-mentioned solid electrolyte precursor contains PEO (polyethylene oxide) as a polymer (ion-conducting polymer), lithium bis(trifluoromethylsulfonyl)imide as a salt (supporting salt), and AIBN (azobisisobutyronitrile) as a polymerization initiator for promoting cross-linking reaction of the above-mentioned polymer in a mass ratio of 100:10:0.1.

The thickness of the thus obtained lithium ion secondary battery was 1.5 mm, and was much thinner than a conventional lithium ion secondary battery.

In the lithium ion secondary battery of Example 11, since both the supporting substrate and the cover member are transparent, the entirety looks transparent. In the case of the lithium ion secondary battery of Example 11, in a region in which the teeth of the comb-shaped electrode 1a and the comb-shaped electrode 1b are alternately arranged seen in the direction perpendicular to the direction of the length of teeth in the comb-shaped electrode 1a and comb-shaped electrode 1b and parallel to the substrate 4, an area ratio of a transmission portion to the total of the teeth of the comb-shaped electrode 1a, the teeth of the comb-shaped electrode 1b, and a gap between the teeth of the comb-shaped electrode 1a and the teeth of the comb-shaped electrode 1b (transmission portion) was about 42% when viewed from a direction perpendicular to the substrate 4.

In the lithium ion secondary battery of Example 11, when the thickness of teeth was changed to 20 µm, the space between two adjacent teeth was changed to 120 µm, the number of teeth was changed to 92, and the thickness of the active material layer was changed to 20 µm, the above-mentioned area ratio was about 86%. Furthermore, in the lithium ion secondary battery of Example 11, when the thickness of teeth was changed to 20 µm, the space between two adjacent teeth was changed to 200 µm, the number of teeth was changed to 59, and the thickness of the active material layer was changed to 20 µm, the above-mentioned area ratio was about 91%.

Transparent nonaqueous secondary batteries are also expected to contribute to improvement of design when they are used in combination with articles having, for example, an electrical generating element having a transparent member such as dye-sensitized solar cell or other transparent members.

Furthermore, the lithium ion secondary battery of Example 11 can be changed (curved) into a desired shape, because both the supporting substrate and the cover member thereof have flexibility. A non-aqueous battery provided with a flexible supporting substrate and cover member and having flexibility can be easily attached to, for example, a human body or the surface of clothes, and accordingly it is expected to be applied to medical, caregiving, and health care fields when it is combined with a sensor and the like.

Example 12

Step (1)

An electrode pattern in which the comb-shaped electrodes 1a and 1b are disposed was obtained for each unit cell similar to Example 1 except that a mask is changed such that a plurality of electrode patterns for the unit cell are formed on a silicon substrate (silicon wafer). In each unit cell, the size was 1.0 cm×0.8 cm, and the film thickness of the electrode pattern is 40 µm.

Step (2)

A solid electrolyte precursor having the same composition as in Example 11 was applied to each unit cell, in which masking had been carried out with a tape on the surrounding thereof, by a casting process, followed by baking at 100° C. for one hour so as to form a solid electrolyte. It should be noted that when each electrode pattern and solid electrolyte were verified by cross-sectional SEM, occurrence of mixing was not observed between the comb-shaped electrode 1a or 1b and the solid electrolyte, the upper part of the electrode patterns and the space part in the electrode patterns were filled or coated with the solid electrolyte.

Step (3)

Thereafter, the tape for masking was stripped off, gas barrier coating membrane formation material 1 or 2 having the following composition was applied to the entire surface of the silicon wafer on which the electrode patterns had been formed and the solid electrolyte had been disposed, followed by baking at 100° C. for 20 minutes, so that the entire surfaces of the combination of the comb-shaped electrodes 1a and 1b and the solid electrolyte were coated with the gas barrier coating membrane.

It should be noted that when the gas barrier coating membrane was stripped off, occurrence of mixing was not observed between the gas barrier coating membrane and the solid electrolyte.

The gas barrier coating membrane formation material 1 was obtained by adjusting SEPTON8004 (manufactured by KURARAY CO., LTD.) with ethylhexane such that the concentration was 10 mass %.

The gas barrier coating membrane formation material 2 was obtained by adjusting APEL 8007 (manufactured by Mitsui Chemicals, Inc.) with ethylhexane such that the concentration was 10 mass %.

Step (4)

The above-mentioned silicon wafer, on which the entire surface of the combination of the comb-shaped electrodes 1a and 1b and the solid electrolyte was coated with gas barrier coating membrane derived from the gas barrier coating membrane formation material 1 or 2, was divided into individual pieces for each unit cell.

Step (5)

The individual lithium ion secondary batteries obtained by the above dividing process were charged and discharged at 25° C. or 40° C. with an electric current value at 100 µA. Charge-discharge curves of the lithium ion secondary battery produced by using the gas barrier coating membrane formation material 1 are shown in FIG. 14. The discharge capacity was 70.3 µAh when the measurement temperature was 25° C. (FIG. 14A), and 94.2 µAh when the measurement temperature was 40° C. (FIG. 14B).

It should be noted that in Example 12, masking with tape was carried out in step (2), but use of UV curing material as a solid electrolyte precursor can impart selectivity such that solid electrolyte is formed only on the upper part of the electrode patterns on which a unit cell is formed.

Furthermore, after step (3) in Example 12, in order to further increase the barrier property, inorganic gas barrier material may be formed on the gas barrier coating membrane obtained in step (3) by a coating process or a vacuum film formation process. For example, a film of aluminum can be formed by a sputtering process.

Furthermore, after step (3) in Example 12 or after the above-mentioned inorganic gas barrier material was formed into a film, in order to increase the barrier property, further sealing material may be used. For example, epoxy resin based sealing material including 10 mass % diethylene triamine with respect to jER811 (manufactured by Mitsubishi Chemical Corporation) was used and subjected to low-temperature baking at 50° C. for two hours and further at 100° C. for 30 minutes so as to form a sealing film.

Furthermore, in step (4) in Example 12, before dividing into individual pieces for each unit cell, a silicon wafer may be thinned. For example, a silicon wafer having a film thickness of 750 µm can be thinned to about 100 µm by thinning processing, and thus, a nonaqueous secondary battery that is smaller in the entire size can be produced.

With the production method described in Example 12, a plurality of cells having various electrode patterns or sizes can be produced at the same time at high efficiency.

EXPLANATION OF REFERENCE NUMERALS 1a, 1b Comb-shaped electrode
2 Conductive layer
2a, 2b Current collector
3a, 3b Active material layer
4 Substrate
5 Current collector-formation resist layer
5a, 5b Resin pattern
6 Resist layer
7a, 7b Guide hole
8, 8A Electrolyte
9, 9A Cover member
10 Liquid injection hole
11 Support
12 First resist layer
13a, 13b Guide hole
14a, 14b Pattern material layer
15 Second resist layer
16 Non-alkali glass
17 Blasting resist
50 Adhesive agent
51a, 51b Terminal
100, 100A Nonaqueous secondary battery

The invention claimed is:

1. A nonaqueous secondary battery comprising:
a positive electrode;
a negative electrode;
a substrate;
a cover member; and
an electrolyte,
wherein the positive electrode and the negative electrode are arranged in substantially the same plane and respective end surfaces of the positive electrode and the negative electrode face each other at a distance;
the substrate fixingly supports the positive electrode and the negative electrode;
the cover member has gas barrier properties and defines an airtight chamber together with the substrate;
the cover member comprises glass, a glass film, or silicon, and
a noble metal or a hydrofluoric acid-resistant inorganic oxide selected from the group consisting of $Al_2O_3$, $ZrO_2$, ZnO, $Nb_2O_5$, $Ta_2O_5$, and $TiO_2$ is vapor-deposited to the cover member which is brought into contact with the electrolyte;
the airtight chamber contains the positive electrode and the negative electrode;
the electrolyte is contained in the airtight chamber and is configured to be present at least between the facing end surfaces of the positive electrode and the negative electrode.

2. The battery according to claim 1, wherein the cover member has hydrofluoric acid-resistance.

3. A method for manufacturing the nonaqueous secondary battery according to claim 1, the method comprising:
forming a positive electrode and a negative electrode both on a substrate, respective end surfaces of the positive electrode and the negative electrode facing each other at a distance;
bonding a cover member to the substrate, the cover member being configured to define an airtight chamber together with the substrate, the airtight chamber containing the positive electrode and the negative electrode; and
filling the airtight chamber with an electrolyte which is present at least between the facing end surfaces of the positive electrode and the negative electrode.

4. A method for manufacturing the nonaqueous secondary battery according to claim 1, the method comprising:
forming a positive electrode and a negative electrode both on a substrate, respective end surfaces of the positive electrode and the negative electrode facing each other at a distance;
disposing an electrolyte at least between facing end surfaces of the positive electrode and the negative electrode;
providing a cover member by any one of methods (1) to (4) below; and
fixing the cover member to the substrate, the cover member being configured to define an airtight chamber together with the substrate, the airtight chamber containing the positive electrode and the negative electrode, and the airtight is being filled with the electrolyte,
wherein the electrolyte is a gel electrolyte or a solid electrolyte,
wherein the methods are:
(1) attaching a coating film to the electrolyte directly or through an adhesive agent;
(2) forming a coating membrane made of gas barrier material by film-forming organic or inorganic gas barrier material on the electrolyte or on the coating film attached to the electrolyte by an application process or a vacuum film-formation process; and
(3) forming a film of metal on the electrolyte or the coating film attached to the electrolyte or a coating membrane made of the organic gas barrier material by a coating process or a vacuum film formation process, or the like,
(4) forming a coating membrane made of inorganic compound coating material on the electrolyte or the coating film attached to the electrolyte or a coating membrane made of the organic gas barrier material by a coating process or a vacuum film formation process, or the like.

5. The method according to claim 3,
wherein the forming comprises:
forming a current collector by forming a conductive layer on a surface of the substrate, and patterning the conductive layer,
applying a resist composition and forming a resist layer on a surface of the substrate including the current collector,
forming a guide hole configured to form a positive electrode or a negative electrode above the current collector by irradiating the surface of the resist layer with light through a mask and developing the resist layer, and
forming an active material layer on a surface of the current collector by using the guide hole as a casting mold.

6. The method according to claim 4, wherein the forming comprises:
forming a current collector by forming a conductive layer on a surface of the substrate, and patterning the conductive layer;
applying a resist composition and forming a resist layer on a surface of the substrate including the current collector;

forming a guide hole configured to form a positive electrode or a negative electrode above the current collector by irradiating the surface of the resist layer with light through a mask and developing the resist layer; and forming an active material layer on a surface of the current collector using the guide hole as a casting mold.

7. The method according to claim 3, wherein filling of the electrolyte is carried out by immersing the airtight chamber comprising the cover member and the substrate into the electrolyte and reducing pressure or infusion using a syringe.

8. The method according to claim 3, wherein filling of the electrolyte is carried out through a liquid injection hole formed on a lateral surface of the cover member.

9. The method according to claim 3, wherein the cover member is produced by laminating blasting resist on glass, carrying out exposure and development to expose a blast-processed surface, carrying out sandblast processing to dig down the blast-processed surface, and stripping off the resist.

10. The method according to claim 3, wherein both the positive electrode and the negative electrode are comb-shaped, and in a region in which the teeth of both comb-shaped electrodes are alternately arranged in the direction perpendicular to the direction of the length of teeth in the both comb-shaped electrodes and in the direction parallel to the substrate, an area ratio of a transmission portion to the total area of the teeth of the both comb-shaped electrodes, and a gap (transmission portion) between the teeth of the comb-shaped electrode being the positive electrode and the teeth of the comb-shaped electrode being the negative electrode is 40 to 95%.

11. The method according to claim 4, wherein both the positive electrode and the negative electrode are comb-shaped, and in a region in which the teeth of the both comb-shaped electrodes are alternately arranged seen in the direction perpendicular to the direction of the length of teeth in the both comb-shaped electrodes and in the direction parallel to the substrate, an area ratio of a transmission portion to the total area of the teeth of the both comb-shaped electrodes, and a gap (transmission portion) between the teeth of the comb-shaped electrode being the positive electrode and the teeth of the comb-shaped electrode being the negative electrode is 40 to 95%.

12. The method according to claim 3, wherein the forming comprises:
(a) forming a current collector by forming a conductive layer on a surface of the substrate, and patterning the conductive layer;
(b) applying a resist composition and forming a resist layer on a surface of the substrate including the current collector;
(c) forming a guide hole configured to form a positive electrode or a negative electrode above the current collector by irradiating the surface of the resist layer with light through a mask and developing the resist layer;
(d) forming an active material layer on a surface of the current collector by using the guide hole as a casting mold; and
The (b) applying, (c) forming, and (d) forming is performed by a first or second pattern formation method;
the first pattern formation method being a pattern formation method in which n patterns (n: an integer of at least 2) of identical or different pattern materials are formed on a support, and the method includes: forming a first resist layer by applying a positive-type resist composition to a surface of the support, the following steps of (1) to (3) are repeated for a kth pattern material and a kth resist layer in an order from k=1 to k=(n−1) (k: an integer of 1 to (n−1)): (1) forming a guide hole penetrating through the first to the kth resist layers by exposure and development; (2) filling a kth pattern material into the above-mentioned guide hole by a screen printing process; and (3) forming a (k+1)th resist layer by applying a positive-type resist composition to the kth resist layer and the kth pattern material which has been filled into the guide holes, thus forming a guide hole penetrating the first to the nth resist layers by exposure and development, filling a nth pattern material into the guide hole by a screen printing process, and removing the first to the nth resist layers; and the second pattern formation method being a pattern formation method in which n patterns (n: an integer of at least 2) of identical or different pattern materials are formed on a support, and the method includes: forming a first resist layer by applying a resist composition to a surface of the support, the following steps of (1) to (4) are repeated for a kth pattern material and a kth resist layer in order from k=1 to k=(n−1) (k: an integer of 1 to (n−1)): (1) forming a guide hole penetrating the kth resist layer by exposure and development, (2) filling a kth pattern material into the above-mentioned guide hole by a screen printing process, (3) removing the kth resist layer, and (4) forming a (k+1)th resist layer by applying a resist composition to the support and the first to the kth pattern materials, thus forming a guide hole penetrating the nth resist layer by exposure and development, filling the nth pattern material into the guide hole by a screen printing process, and removing the nth resist layer.

13. The method according to claim 4, wherein the forming comprises:
(a) forming a current collector by forming a conductive layer on a surface of the substrate, and patterning the conductive layer;
(b) applying a resist composition and forming a resist layer on a surface of the substrate including the current collector;
(c) forming a guide hole configured to form a positive electrode or a negative electrode above the current collector by irradiating the surface of the resist layer with light through a mask and developing the resist layer;
(d) forming an active material layer on a surface of the current collector by using the guide hole as a casting mold; and
The (b) applying, (c) forming, and (d) forming is executed by a first or second pattern formation method;
the first pattern formation method being a pattern formation method in which n patterns (n: an integer of at least 2) of identical or different pattern materials are formed on a support, and the method includes: forming a first resist layer by applying a positive-type resist composition to a surface of the support, the following steps of (1) to (3) are repeated for a kth pattern material and a kth resist layer in an order from k=1 to k=(n−1) (k: an integer of 1 to (n−1)): (1) forming a guide hole penetrating through the first to the kth resist layers by exposure and development; (2) filling a kth pattern material into the above-mentioned guide hole by a screen printing process; and (3) forming a (k+1)th resist layer by applying a positive-type resist composition to the kth resist layer and the kth pattern material which has been filled into the guide holes, thus forming a guide hole penetrating the first to the nth resist layers by exposure and development, filling a nth pattern material into the guide hole by a screen printing process, and removing the first to the nth resist layers; and the second pattern formation method being a pattern formation method in which n patterns (n: an integer of at least 2) of identical or different pattern materials are formed on a support, and the method includes: forming a first resist layer by applying a resist composition to a surface of the support, the following steps of (1) to (4) are repeated for a kth pattern material and a kth resist layer in order from k=1 to k=(n−1) (k: an integer of 1 to (n−1)): (1) forming a guide hole penetrating the kth resist layer by exposure and development, (2) filling a kth pattern material into the above-mentioned guide hole by a screen printing process, (3) removing the kth resist layer, and (4) forming a (k+1)th resist layer by applying a resist composition to the support and the first to the kth pattern materials, thus forming a guide hole penetrating the nth resist layer by exposure and development, filling the nth pattern material into the guide hole by a screen printing process, and removing the nth resist layer.

* * * * *